US007773800B2

(12) United States Patent
Liu

(10) Patent No.: US 7,773,800 B2
(45) Date of Patent: Aug. 10, 2010

(54) ATTRASOFT IMAGE RETRIEVAL

(75) Inventor: Ying Liu, 1020 PineNeedle Dr.,
Savannah, GA (US) 31410

(73) Assignee: Ying Liu, Savannah, GA (US)

( * ) Notice: Subject to any disclaimer, the term of this patent is extended or adjusted under 35 U.S.C. 154(b) by 1732 days.

(21) Appl. No.: 10/078,299

(22) Filed: Feb. 20, 2002

(65) Prior Publication Data

US 2003/0035595 A1    Feb. 20, 2003

Related U.S. Application Data

(60) Provisional application No. 60/296,245, filed on Jun. 6, 2001.

(51) Int. Cl.
*G06K 9/62* (2006.01)
(52) U.S. Cl. .................................................. 382/158
(58) Field of Classification Search ......... 382/155–159, 382/225; 704/256–256.8; 706/20, 26
See application file for complete search history.

(56) References Cited

U.S. PATENT DOCUMENTS

| | | | | |
|---|---|---|---|---|
| 5,802,361 | A * | 9/1998 | Wang et al. | 382/217 |
| 6,304,864 | B1 * | 10/2001 | Liddy et al. | 706/15 |
| 6,459,809 | B1 * | 10/2002 | Jensen et al. | 382/203 |
| 6,463,426 | B1 * | 10/2002 | Lipson et al. | 707/3 |
| 6,665,335 | B1 * | 12/2003 | Rajagopal et al. | 375/224 |
| 6,697,504 | B2 * | 2/2004 | Tsai | 382/118 |
| 6,754,389 | B1 * | 6/2004 | Dimitrova et al. | 382/224 |
| 6,795,818 | B1 * | 9/2004 | Lee | 707/3 |
| 6,847,733 | B2 * | 1/2005 | Savakis et al. | 382/225 |
| 6,944,319 | B1 * | 9/2005 | Huang et al. | 382/118 |
| 7,028,050 | B1 * | 4/2006 | Rose | 707/104.1 |

OTHER PUBLICATIONS

Laaksonen et al., Application of Tree Structured Self-Organizing Maps in Content-Based Image Retrieval,Sep. 7-10, 1999, Artificial Neural Networks, 1999. ICANN 99. Ninth International on(Conf. Publ. No. 470), vol. 1, pp. 174-179.*

Drossu et al., A flexible Graphical User Interface for Embedding Heterogeneous Neural Network Simulators, Aug. 1996, Education, IEEE Transactions on, vol. 39, Issue: 3, pp. 367-374.*

(Continued)

*Primary Examiner*—Matthew C Bella
*Assistant Examiner*—Dennis Rosario

(57) ABSTRACT

A system, methods, and algorithms for content-based image retrieval and recognition system, useful in all types of images and image formats. An image(s) or an image segment(s), which is specified by the user in two clicks (the first in the upper-left corner and the second in the bottom-right corner), specifies the content-based sample. The sample image(s) is used to teach the system what to look for via the ABM (Attrasoft Boltzmann Machine) algorithm and APN (Attrasoft PolyNet) algorithm; the system then searches through one or many directories, which is specified by the user, and presents the search results. The search result consists of pairs of matched images and its Weight (score), which specifies the similarity between the sample and matching images. These weights are also being used to classify images in the cases of the classification problem. The users are able to view the retrieved images in the result via a single click.

4 Claims, 19 Drawing Sheets

OTHER PUBLICATIONS

Aldana, Data Mining Industry: Emerging Trends and New Opportunities, May 2000, MIT, pp. 1-182.*

Optimization of Neural Network Topology and Information Content Using Boltzmann Methods, Jun. 7-11, 1992, International Joint Conference on Neural Networks, vol. 4, pp. 594-599.*

Attrasoft, Attrasoft Boltzmann Machine (ABM) for Windows 95/98 Version 2.7 (Jan. 1999), Attrasoft, Jan. 1999 [retreived on Jun. 20, 2008]. Retreived from the Internet: http://attrasoft/oldsite/abm.*

Wood et al., Iterative Refinement by Relevance Feedback in Content-Based Digital Image Retrival, 1998, ACM,pp. 13-20.*

Corrandini et al., Camera-based Gesture Recognition for Robot Control, Jul. 24-27, 2000, Proceedings of the IEEE-INNS-ENNS International Joint Conference on Neural Networks, 2000: IJCNN 2000, vol. 4, pp. 133-138.*

Vivarelli et al., Using Bayesian Neural Networks to Classify Segmented Images,Jul. 7-9, 1997, Fifth International Conference on Artificial Neural Networks (Conf. Publ. No. 440), pp. 268-273.*

Cho, Neural-Network Classifiers for Recognizing Totally Unconstrained Handwitten Numerals, Jan. 1997, IEEE Transactions on Neural Netwroks, vol. 8, No. 1, pp. 43-53.*

Lampinen et al., Bayesian approach for neural networks-review and case studies, Neural Networks, Apr. 1, 2001, vol. 14, Issue 3, pp. 257-274.*

* cited by examiner

Annotated

Images | Scores (a)

(b)

(a)

(b)

ABM Learning Algorithm in Figure 16 (a).

For each connection, add an additional mapping.

ATTRASOFT IMAGE RETRIEVAL

Provisional Application No. 60/296,245 Provisional Filing Date Jun. 6, 2001

TECHNICAL FIELD

The present invention relates generally to image retrieval and image recognition, and more particularly related to a system, methods, and algorithms of content-based image retrieval and recognition system. Within such a system, the image(s) to be retrieved/recognized is not preprocessed with the association of key words (meta-data). This system allows the user of an image retrieval/recognition system, such as software together with a computer, network server, or web server etc, to define a searching criteria by using an image(s), a segment of an image(s), a directory containing images, or combinations of the above. This system will return the result, which contains pairs of the matched image and similarity score. The user can see the matched images in a single click.

This invention can be used in image verification (1-to-1 matching, binary output: match/no match), image identification (1-to-many matching, single output to indicate a classification), image search or retrieval (1-to-many matching, multiple output), and image classification (many-to-1 or many-to-many matching).

BACKGROUND OF THE INVENTION

In certain types of content-based image retrieval/recognition systems, the central task of the management system is to retrieve images that meet some specified constraints.

Most image-retrieval methods are limited to the keyword-based approach via database queries. There are also methods that generate keyword-based via images (Example, LTU Technologies), which is fundamentally database queries based on computer-generated keywords. In this approach, keywords and the images together form a record in a table. The retrieval is based on the keywords in much the same way as the relational database. (Example: Microsoft Access).

The current invention does not use keywords, neither manually generated keywords or keywords generated via some algorithms. The current invention consists of a set of algorithms.

The user operation is generally divided into two phases: the learning phase and the search/recognition phase. In the learning phase, various types of processes, such as image preprocessing and image filtering are applied to the images. Then the images are sent to a recognition module to teach the module the characteristics of the image. The learning module can use various algorithms to learn the sample image(s). In the search/retrieval phase, the recognition module decides the classification of an image in a search directory or a search database.

A very small number of commercially available products exist which perform content-based image retrieval.

Informix Internet Foundation 2000 is an object-relational database management system (ORDBMS), which supports non-alphanumeric data types (objects). IIF2000 supports several DataBlade modules including the Excalibur Image DataBlade module to extend its retrieval capabilities. DataBlade modules are server extensions that are integrated into the core of the database engine. The Excalibur Image DataBlade is based on technology from Excalibur Technologies Corporation, and is co-developed and co-supported by Informix and Excalibur. The core of the DataBlade is the Excalibur Visual retrievalWare SDK. The Image DataBlade module provides image storage, retrieval, and feature management for digital image data. This includes image manipulation, I/O routines, and feature extraction to store and retrieve images by their visual contents. An Informix database can be queried by aspect ratio, brightness, global colour, local colour, shape, and texture attributes. An evaluation copy of IIF2000 and the Excalibur Image DataBlade module can be downloaded from Informix.

IMatch is a content-based image retrieval system developed for the Windows operating system. The software was developed by Mario M. Westphal and is available under a shareware license. IMatch can query an image database by the following matching features: colour similarity, colour and shape (Quick), colour and shape (Fuzzy), colour percentage, and colour distribution. A fully functional 30-day evaluation copy is available for users to assess the software's capabilities and can be downloaded from Mario M. Westphal's web site. The shareware version has a 2000 limit on the number of images that can be added to a database. A new version of the software was released on the 18 Feb. 2001.

The Oracle8i Enterprise Server is an object relational database management system that includes integral support for BLOBs. This provides the basis for adding complex objects, such as digital images, to Oracle databases. The Enterprise release of the Oracle database server includes the Visual Information retrieval (VIR) data cartridge developed by Virage Inc. OVIR is an extension to Oracle8i Enterprise Server that provides image storage, content-based retrieval, and format conversion capabilities through an object type. An Oracle database can be queried by global color, local color, shape, and texture attributes. An evaluation copy of the Oracle8i Enterprise Server can be downloaded from Oracle, Inc.

TECHNICAL BACKGROUND

The concepts in this section are well known and they are not a part of this invention. They are listed to facilitate the understanding of the rest of this invention because these concepts are generally not grouped together in any textbooks or publications. In particular, the various spaces, distances in these spaces, and their relationship with image recognition are explained.

1. Images

An image consists of a set of pixels. For example, a 480×640 image will have 307,200 pixels. A pixel can have a set of values. For example, a pixel in a red color image can have three values: RGB=(Red, Green, Blue)=(255, 0, 0). A grey image can reduce three numbers into a single number. For example, a grey pixel has a value=128. For simplicity, in the rest of this section, we assume each pixel has a single value.

There are two ways to describe an image. Each description yields different features of the image. We will first introduce these descriptions; we will then explain the image spaces and the distances between images in these image spaces.

The first way to describe an image is to use a vector. For example, a 5-pixel image is described as (10, 20, 30, 40, 50). A vector is also viewed as a point in a vector space; therefore, an image can be viewed as a point in a vector space. For example, a 480×640 image can be viewed as a point in a vector space of 307,200 dimensions.

The second way to describe an image is to use a set of particles. First of all, a binary image (black-and-white) is described by a set. For example, a 5-pixel image is described as 10101. Let the pixels be described by five elements in a set: 0, 1, 2, 3, and 4, then the binary image 10101 represents the set {0, 2, 4}. Here is another example, 11100 represents the set {0, 1, 2}. N elements will yield $2^N$ subsets. N pixels will yield $2^N$ black-and-white images. All of the $2^N$ subsets together form a space. A subset is a point in this space. All of the $2^N$ black-and-white images together form a space. A black-and-white image is a point in this space. Now we extend this definition of images beyond the binary values. Consider each element in a set is a mass particle that has an integer mass value; then a color image can be described as a set of mass particles. For example, (128, 0, 256, 0, 128) is a set of mass particles {0, 2, 4}, where particle 0 has mass 128, particle 2 has mass 256, and particle 4 has mass 128.

To summarize, an image is a point in a space. The space can be a vector space, which consists of a set of vectors. The space can be a subset space, which consists of a set of subsets.

In either description, the distance between two points can be defined, i.e. the distance between two images can be defined. In a vector space, the distances are $L_p$-distances, where p=1, 2, ..., ∞. For simplicity, consider a two-dimensional vector space; then the distances are:

$$L_1 = |x_2 - x_1| + |y_2 - y_1|$$

$$L_2 = \sqrt{(x_2 - x_1)^2 + (y_2 - y_1)^2}$$

$$L_\infty = \max\{|x_2 - x_1|, |y_2 - y_1|\}$$

In a subset space, the distance between two points is called the Hausdorff distance. We will only use an example to illustrate what the Hausdorff distance is. Consider two cities as two sets, the Hausdorff distance between the two cities is this: you can start from any point in one city, after traveling the Hausdorff distance toward the second city, you will be guaranteed to be in the second city.

2. Mapping

Mapping establishes a relationship between a Domain to a Range. Both a Domain and a Range are sets. For example, a Domain can be {a, b} and a Range can be {0, 1}, then a mapping is {a0, b1}. If both Domain and Range are a set of finite elements, when the Domain is removed, the Range will form a vector. In the above example, when the domain is removed, the Range is a vector, (0, 1).

3. Markov Chain and Pattern Classification

A Markov chain is a sequence of random values whose probabilities at a time step depends upon the value of the number at the previous time step. The controlling factor in a Markov chain is the transition-probability; it is a conditional probability for the system to go to a particular new state, given the current state of the system. The key feature of a Markov chain is its invariant distribution: after a Markov chain evolves long enough, the probability for each configuration to appear is fixed.

For example, let a Markov chain have two states, 0 and 1. The transition matrix elements are, $t_{00} = t_{01} = 0.5$, $t_{10} = 0$, $t_{11} = 1$. A possible evolution is 000111111 .... Another possible evolution is 000000011111111. The invariant distribution is f(0)=0, f(1)=1.

This invariant distribution can be used to classify patterns as follows. Let x be an image, and let a, b be two classes. We can construct the two possible vectors: (x, a) and (x, b). Let an invariant distribution function of a Markov chain be z=F(y), where y is a vector. Assume y=(x, a), z=z1; and y=(x, b), z=z2, then this invariant distribution function actually classifies the image, x, as follows: the probability of x in class a is z1; and the probability of x in class b is z2. If we can further assume z1>>z2, then x is classified as a member in class a.

In particular, assume a Markov chain is constructed with an image p. Let x be an image, and let 0 (No Match), 1 (Match) be two classes; then the two possible vectors are (x, 0) and (x, 1). After the Markov chain evolves long enough, an invariant distribution of the Markov chain is reached. Let a distribution function be z=F(y), where y is a vector. If y=(x, 0), z=z0; and y=(x, 1), z=z1, then the probability of x in class 0 is z0 and the probability of x in class 1 is z1. The matching score between image p and image x will be z1.

A triplet is (x, 0, z0) or (x, 1, z1). A doublet is (x, z1).

4. Markov Chain and Neural Network

A particular type of neural network is called a Boltzmann Machine, in which each neuron has a certain probability to be in state 0 and a certain probability to be in state 1. A Boltzmann Machine forms a Markov chain.

5. Artificial Neural Net

The artificial neural net is a dynamical system, which will transit from one state to the next according to its internal connections.

The configuration space is a set of all possible configurations. For example, assume there are three binary neurons and the set of all possible configurations is {000, 001, 010, 011, ..., 111}. Each configuration in this space is considered as a point. In general, if there are N neurons, there will be $2^N$ points in the configuration space.

An input image will ultimately be mapped into a neural net. The number of pixels, in general, does not agree with the number of neurons. Mapping an input image into a given neural net will be necessary.

The connection space in this invention is the set of all possible connections. For example, assume there are three binary neurons {0, 1, 2} and the set of all possible connections is {nothing, 0, 1, 2, 01, 02, 12, 012}, where {0, 1, 2} are self connections, {01, 02, 12} are regular connections, and {012} is a high order connection. Each connection in this space is considered as a point. In general, if there are N neurons, there will be $2^N$ points in the connection space.

The synaptic connection matrix is a mapping from the connection space to real numbers. For example, the action of a neuron can be:

$$X_k' = f(1, a_k, a_{ik} X_i, a_{ijk} X_i X_j, a_{ijlk} X_i X_j X_l, \ldots)$$

Where $X_i$ are neuron states (grounded or excited) at a time step, $X'_i$ are neuron states at the next time step, $a_k$, $a_{ik}$, $a_{ijk}$, $a_{ijlk}$, ... are connection matrix elements, and f(x1, x2, x3, ...) are a function which governs the neuron transition. The points in the connection space is represented as follows: assume there are four binary neurons {0, 1, 2, 3} and the set of all possible connections is {nothing; 0, 1, 2, 3; 01, 02, 03, 12, 13, 23; 012, 013, 023, 123; 0123}, where {0, 1, 2, 3} are self connections, {01, 02, 03, 12, 13, 23} are regular connections, and {012, 013, 023, 123; 0123} are the high order connections. These connections are: 0000=nothing, 1000=neuron 0's self-connection, 0100=neuron 1's self-connection, ..., 1100=connection between neuron 0 and 1, ..., i.e. the connections are {0000, 1000, 0100, 0010, 0001, 1100, 1010, 1001, 0110, 0101, 0011, 1110, 1101, 1011, 0111, 1111}.

An input vector for a neural network or an input vector is a vector built from an image pixel array. The number of pixels, in general, does not agree with the number of neurons. Mapping an input image into a given neural net will be necessary. For example, let an 8-pixel grey image have the pixel array (10, 20, 30, 40, 50, 60, 70, 80) and let a 4-neuron net be {0, 1, 2, 3}, the input vector can be obtained by pixel average: (15, 35, 55, 75).

SUMMARY OF THE INVENTION

The present invention is different from Informix database where images can be queried by aspect ratio, brightness, global colour, local colour, shape, and texture attributes. The present invention is different from Imatch where images can be queried by colour similarity, colour and shape, colour percentage, and colour distribution. The present invention is different from the Oracle8i Enterprise Server where images can be queried by color, local color, shape, and texture attributes.

The present invention is unique in its learning and matching algorithms. The current algorithms do not use methodologies deployed in the above systems. In particular, the following parameters are not used: aspect ratio, brightness, global colour, local colour, shape, colour similarity, colour and shape, colour and shape, colour percentage, and colour distribution, local color, shape, and texture attributes. The present invention has nothing in common with any existing system.

Even though the current invention is applied to images, the algorithms in the invention can be applied to other types of data, such as sound, movie, . . . .

1. Process

The present invention is a content-based image retrieval/recognition system, where users specify an image(s) or segment(s); adjust control parameters of the system, and query for all matching images from an image directory or database. The user operation is generally divided into two phases: learning phase and search/recognition phase.

The process roughly divided into several modules: processing, learning and recognition. Before learning and recognition, various types of processes, such as image preprocessing, and image filtering are applied to the images.

In the learning phase, some sample images are sent to a learning module to teach the module the characteristics of the image as specified by an array of pixels. Each pixel is defined by an integer(s), which can have any number of bits. The learning module can use ABM or APN learning algorithms to learn the sample image. Both the ABM and APN learning algorithms are new inventions.

In the search/retrieval phase, the recognition module searches a source such as all image in a folder, or all image in a database table. The recognition module can use ABM or APN recognition algorithms to match the sample image(s) against all images from a source. Both the ABM and APN recognition algorithms are new inventions.

In a retrieval/recognition system, a "training" for the system or "learning" by the system is to teach the system what characteristics of an image, or a segment of an image (key) to look for. A system operator completes this step by specifying the sample image(s); specifying the parameters, and starting the "training" process by clicking a button. A "retraining" by the system is to teach the system what characteristics of images to look for with additional sample images, after the system is already trained. Training and retraining together allows the system to learn from many sample image(s) and segment(s) simultaneously.

A "search" or "retrieval" is to look for matching images from an image source such as, directory, many directories, subdirectories, network, Internet, or database, etc. A system operator completes this step by specifying the image source such as search directory(s), specifying the parameters and starting "searching" process by clicking a button, which appears in the graphical user interface of the system. The results can be displayed within the software systems or displayed in a program created by the system.

Several applications for the invented ABM learning algorithm, APN learning algorithm, ABM recognition algorithm, and APN recognition algorithm are listed below:

Verification

Verification is a one-to-one (1:1) Matching of a single sample image set against another. Generally, the first sample is newly captured and the second is the enrolled identifier on file for a particular subject. For example, in a user authentication environment, a score exceeding the threshold would return a 'match', resulting in the authentication of the user. A score below the threshold would return a 'no-match', resulting in the denial of access.

Identification

Identification is a one-to-many (1:N) Matching of a single sample image set against a database of samples, with no declared identity required. The single image is generally the newly captured sample and the database contains all previously enrolled samples. Scores are generated for each comparison, and an algorithm is used to determine the matching record, if any. Generally, the highest score exceeding the threshold results in Identification.

Search/Retrieval

Search is similar to Identification, i.e. one-to-many (1:N) Matching; however, the result is a set of possible matching images, not a classification. Identification returns a classification, while Search returns multiple matched images.

Classification

In the above three cases, only one class of image(s) is compared with a set of images to be searched. "Classification" is many-to-one (N:1) or many-to-many (N:N) Matching. It specifies one image in one of many categories. Classification is a many-to-many (N: N) matching with a single output to indicate a classification.

After the operator completes a matching process, the results consists of a list of pairs; the pairs consist of the matched image and the "weight", which reflects how closely the selected image matches the sample image(s).

A search process, which is applicable to retrieval, verification, and identification, is:
1. Enter key image into the system;
2. Set training parameters and click the Training button to teach the system what to look for;
3. Enter search-directory(s);
4. Set search parameter(s), and click the Search button;
5. The system output is a list of names and weights:
   The weight of an image is related to the characteristics you are looking for (the weight is similar to an Internet search engine weight);
   Click the name of each image and an image will pop up on the screen.
   FIG. 1 is the flow chart version of this algorithm.

A classification process is:
1. Enter key image into the system for each class;
2. Set training parameters and click the Training button to teach the system what to look for;
3. Enter search-directory(s);
4. Set search parameter(s), and click the Search button;
5. Click the "Classification" button. The output web page will first list the sample images for each class. Then it will list:

An image link for each image in the search directory;

The classification weights of this image in each search; and

The classification of this image as a link.

A classification process consists of several Search processes. Each class has a key image. This key image is used to match against all images in a search-directory. The results consist of a set of matched images and their matching scores. An image in the search-directory can be matched with several key images. The highest weight determines the final classification of an image in the search-directory. FIG. 7 is the flow chart version of this algorithm.

A batch process consists of executing a batch code. Each search process or a classification process has its own batch code. A batch code for a search process is a text file that consists of:

1. Key image to train the system;
2. Training parameters;
3. Search-directory to specify a set of images to be searched;
4. Search parameters.

A batch code for a classification process is a text file, that consists of several sets of parameters, one set for each class. Each set of parameters consist of:

1. Key image to train the system;
2. Training parameters;
3. Search-directory to specify a set of images to be searched;
4. Search parameters.

The batch code is generated automatically; for example, click a Save button to save the current setting, including key(s), search directory(s), and parameters, into a batch code. The batch code can be viewed by clicking a button to recall one of the many batch codes saved earlier. The batch execution can duplicate the Search Process and the Classification Process in two clicks in a software implementation: the first click opens the proper batch code that needs to be executed and the second click runs the batch code.

The batch process is:
1. Provide the batch code to the system, which includes:

Click the Save button to save the current setting, including key(s), search directory(s), and parameters into a batch code.

Click a File button to recall one of the many batch codes saved earlier.

Cut and paste or simply type in a batch code by keyboard.
2. Click Batch button to execute the code.

FIG. 8 is the flow chart of the batch process.

2. Parameters

The search, classification, and batch processes require a set of parameters. All the parameters can be specified in a user interface. The parameters are specially related to the ABM and APN algorithms. FIGS. 3 and 4 show a sample implementation of these parameters.

The "Area of Interest" specifies an image segment, which is specified by 4 numbers: the coordinates of the upper-left corner and the bottom-right corner.

The "internal representation" specifies the dimensions of a pixel array used for computation, which may or may not be the actual image pixel array.

The "Background" or "Background filter" selects an image-processing threshold filter.

The "Symmetry" represents similarity under certain types of changes, such as Intensity, Translation symmetry, Scaling, Rotation, Oblique, combined Rotation and Scaling or any combination thereof.

The "Rotation Types" specify the range of rotation if the Rotation symmetry is used. Examples are 360°-rotations, −5° to 5° rotations, and −10° to 10° rotations, or other settings that fit the user's need.

The "Sensitivity" deals with the sample segment size; high sensitivity is for small segment(s) and low sensitivity is for large segment(s).

The "Blurring" measures the distortion due to data compression, translation, rotation, scaling, intensity change, and image format conversion.

3. System Layout

Attrasoft Component-Object structure consists of three layers (See FIG. 2):

Application Layer

Presentation Layer

ABM Network Layer

The ABM Network Layer has two algorithms to be claimed in the present invention:

ABM (Attrasoft Boltzmann Machine);

Attrasoft PolyNet (APN): multi-valued ABM.

This layer is responsible for learning and classification.

The Presentation Layer is an interface between the ABM net layer and the user interface layer. There are two types of data used by the systems: user data or application data, and ABM neural data. ABM networks use ABM neural data. User data depends on the application. The presentation layer converts the image data into neural data used by the ABM layer component.

The Application Layer is the front-end graphical user interface, which the users see directly. This layer collects all parameters required for necessary computation.

4. Algorithms

The ABM layer deploys two algorithms, ABM and APN. The ABM and APN algorithms consist of a combination of the Markov Chain Theory and the Neural Network theory. Both theories are well known. The ABM and APN algorithms are newly invented algorithms, which have never been published.

The following terms are well known: Markov chain, state of Markov chain, invariant distribution.

The basic flow chart for ABM and APN processes are:
1. Combine an image and its classification into a vector.
2. All such together form a mathematical configuration space. Each point in such a space is called a state.
3. A Markov chain exists in such a space where the state of the configuration space is a state of the Markov chain.
4. The construction of such a Markov chain is by a particular type of neural network, called ABM network or APN network. This type of neural net satisfies 3 features: (1) fully connected; (2) the order of the neural net is the same as the number of neurons in the network, i.e. the number of connections is an exponential function of the number of neurons; and (3) the connections follow particular algorithms, known as ABM and APN algorithms.
5. The Markov chain will settle on its invariant distribution. A distribution function is deployed to describe such a distribution. In particular, such distribution function classifies the images.

Explanation:

In Step 1, the explanation on how to combine an image and its classification into a vector is given in the TECHNICAL BACKGROUND section.

In Step 2, no particular action will need to be taken. This is a conceptual step, which views an image as a point in a space or several spaces, resulting in the definition of distances between points. The distance is further used in various parameters and matching computations. The explanation on how to treat an image as a point in an image space is given in the TECHNICAL BACKGROUND section.

In Step 3, a Markov chain is formed. Again, no particular action will need to be taken. This is a conceptual step, which specifies how the image matching will be implemented via the invariant distribution of a Markov chain.

In Step 4, an artificial Neural Network is formed to implement the Markov chain. Both the ABM and the APN satisfies 3 features:
(1) Fully connected;
(2) The order of the neural net is the same as the number of neurons in the network, i.e. the number of connections is an exponential function of the number of neurons; and
(3) The connections follow particular algorithms, known as the ABM and the APN algorithms.

FIG. 10 gives an example of a fully connected artificial neural network with 4 neurons.

FIG. 11 gives an example of a Markov chain generated by a neural net with 4 neurons in FIG. 10. The controlling factor in a Markov chain is the transition-probability Matrix. Assume the neurons are {3, 2, 1, 0} in FIG. 10. Each neural state is a state in the Markov chain. These states are: 0000=0; 0001=1; 0010=2; . . . ; 1111=15. The states are 0000=0; 0001=10010=2; . . . ; 1111=15, i.e. the Markov chain state 0 is a neuron state where all neurons are grounded; the Markov chain state 1 is a neuron state where all neurons are grounded except neuron 0; the Markov chain state 2 is a neuron state where all neurons are grounded except neuron 1; the Markov chain state 3 is a neuron state where neurons 2 and 3 are grounded and neurons 0 and 1 are excited; . . . .

In Step 5, the Markov chain will settle on its invariant distribution, which can be used for identification. Let x be an image, and assume there are two classes: class 0 stands for 'No Match' and class 1 stands for 'Match'; then the two possible vectors are (x, 0) and (x, 1). Let an invariant distribution function of the Markov chain, constructed by the neural network, be z=F(y), where y is a vector. If y=(x, 0), z=z0; and y=(x, 1), z=z1, then the probability of x in class 0 is z0 and the probability of x in class 1 is z1. The result will be {(x, 0, z1), (x, 1, z1)}. The (x, 1, z1) will be the computation result. For simplicity, (x, 1, z1) is further simplified to (x, z1). The users will see results (x, z1) directly in the output of the system. FIG. 5 shows a possible implementation of the Search process results and FIG. 6 shows a possible implementation of the Classification process results.

In the ABM or APN algorithms, content-based image retrieval and image recognition are basically the same problem; therefore, they can be converted from one to the other. To convert from an image search problem to an image recognition problem, one query is required for each class. To see whether an image, say B, is in class A, you first train ABM with all images in class A, then try to retrieve image B. If image B is not retrieved, then image B is not in class A. If image B is retrieved only for class A, then image B is in class A. If image B is retrieved for several classes, the class with the largest relative probability is the one to which image B belongs. Image search is an image classification problem with only 1 class.

ABM is a binary network. APN is a multi-valued network.

5. Components and Application-Programming Interface

Software components can be isolated to be attached to different front-end systems. FIG. 2 shows the three-layer architecture of this invention. This can be done with ABM neural layer alone, or both ABM layer and presentation layer. The ABM layer component is a core of the present invention. The value of such a sub-system is the same as the whole system.

DETAILED DESCRIPTION OF THE DISCLOSED EMBODIMENT

Preferred Embodiment of the Search System

An image search/classification constructed in accordance with the preferred embodiment comprises a computer-based workstation including monitor, keyboard and mouse, a content-based image retrieval software system and a source of images.

The source of the images may be on the local drive, network, or the Internet. The source is connected to the workstation. The source of images may be accessed directly via open files, or indirectly, such as going into a file to find the images or going into a database application to find the images, etc.

The preferred workstation can be a PC or any other type of computer, which connects to a data source.

The preferred content-based image retrieval software system is any software, which has ABM or APN algorithm as a component. It can be a Window-based system, or any other operating system based systems, or Internet based systems.

About this Invention

This invention consists of main newly invented processes:
ABM Process
APN Process
Within each process, there are two newly invented algorithms. For the ABM Process, the new inventions are:
ABM Learning Algorithm;
ABM Recognition Algorithm.
For the APN Process, the new inventions are:
APN Learning Algorithm;
APN Recognition Algorithm.

Overview of the ABM Process

The following terms are well known: synaptic connection or connection.

The basic flow chart for ABM process is:
1. Create an ABM net with no connections;
2. Combine an image and its classification into an input vector.
3. Impose the input vector to ABM Net.
4. The ABM neural connections are calculated based on the input vector. Let N be the number of neurons; the order of connections can be up to N and the number of connections can be 2N, where  represents the exponential function.
5. The Markov chain is formed after the connections are established. This Markov chain will settle on its invariant distribution. A distribution function is deployed to describe such a distribution.
6. This distribution function, once obtained, can be used to classify images. This will produce triplets of (image, class, weight). Image retrieval and classification are two different sides of the same token.
7. These triplets of image, class, and weight can be viewed as the results of the classification process. For the retrieval/ search process, a doublet of image and weight are displayed. The second part of the triple is omitted because the search problem has only one class.

Figure 10:
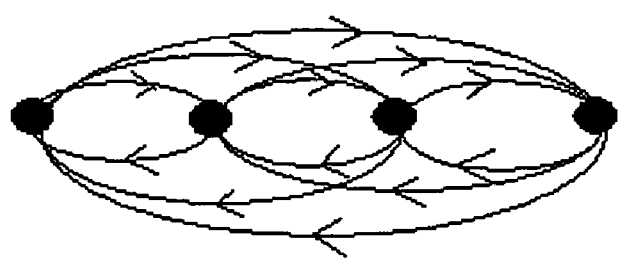
FIG. 10 shows an example of a fully connected artificial neural network with 4 neurons. The controlling factor in a Markov chain is the transition-probability Matrix. Let $p_{ij}$ be the transition probability matrix element from state i to state j. For example, $p_{12}$ is the transition probability from neuron state 0001, where the neuron 0 is excited and the rest are grounded, to neuron state 0010, where the neuron 1 is excited and the rest are grounded. Each neural state is a state in the Markov chain. Assume the neurons are {3, 2, 1, 0}. The states are 0000=0; 0001=1; 0010=2; . . . ; 1111=15. For this Markov chain, state 0 is a neuron state where all neurons are grounded; state 1 is a neuron state where all neurons are grounded except neuron 0; state 2 is a neuron state where all neurons are grounded except neuron 1; state 3 is a neuron state where neurons 3 and 4 are grounded and neurons 0 and 1 are excited; . . . .
Figure 11:
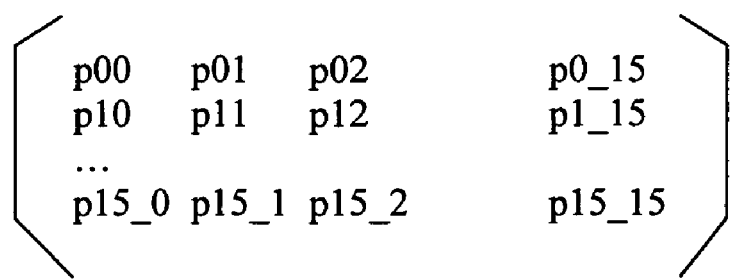
FIG. 11 shows the Markov chain generated by the neural net with 4 neurons in FIG. 10. The controlling factor in a Markov chain is the transition-probability Matrix. Each neural state is a state in the Markov chain. The states are 0000=0; 0001=1; 0010=2; . . . ; 1111=15.

Explanation:
Step 1. An empty neural net is created. It looks like the graph in FIG. 10 without any connections.
Step 2. The explanation on how to combine an image and its classification into a vector is given in the TECHNICAL BACKGROUND section.
Step 3. The ABM net will read an input vector. The Presentation Layer in FIG. 2 prepares the input vector. In general, the image size and the ABM neural net size do not match; for example, an image is 480×640 and a neural net is 100×100. The Presentation Layer in FIG. 2 will reduce the image pixel array to fit the ABM neural network through various methods. This procedure will be specified in more detail later in the "Presentation Layer . . . " section.
Step 4. The ABM will be trained. This step will be further expanded later in the "ABM Training Algorithm" section.
Step 5. The ABM net generates a Markov chain. The ABM net is a fully connected neural net following the rule of the Boltzmann Machine, i.e. each neuron has a certain probability to be excited and a certain probability to be grounded. Such a neural net is a Markov chain. FIGS. 10 and 11 show the relationship between a neural net and a Markov chain. No particular action will need to be taken in this step. This is a conceptual step, which specifies how the image matching will be implemented via the invariant distribution of a Markov chain.

Step 6. An invariant distribution of the Markov chain is reached, which can be used for identification. This step will be further expanded later in the "ABM Recognition Algorithm" section.

Step 7. The results are presented.

Figure 12:
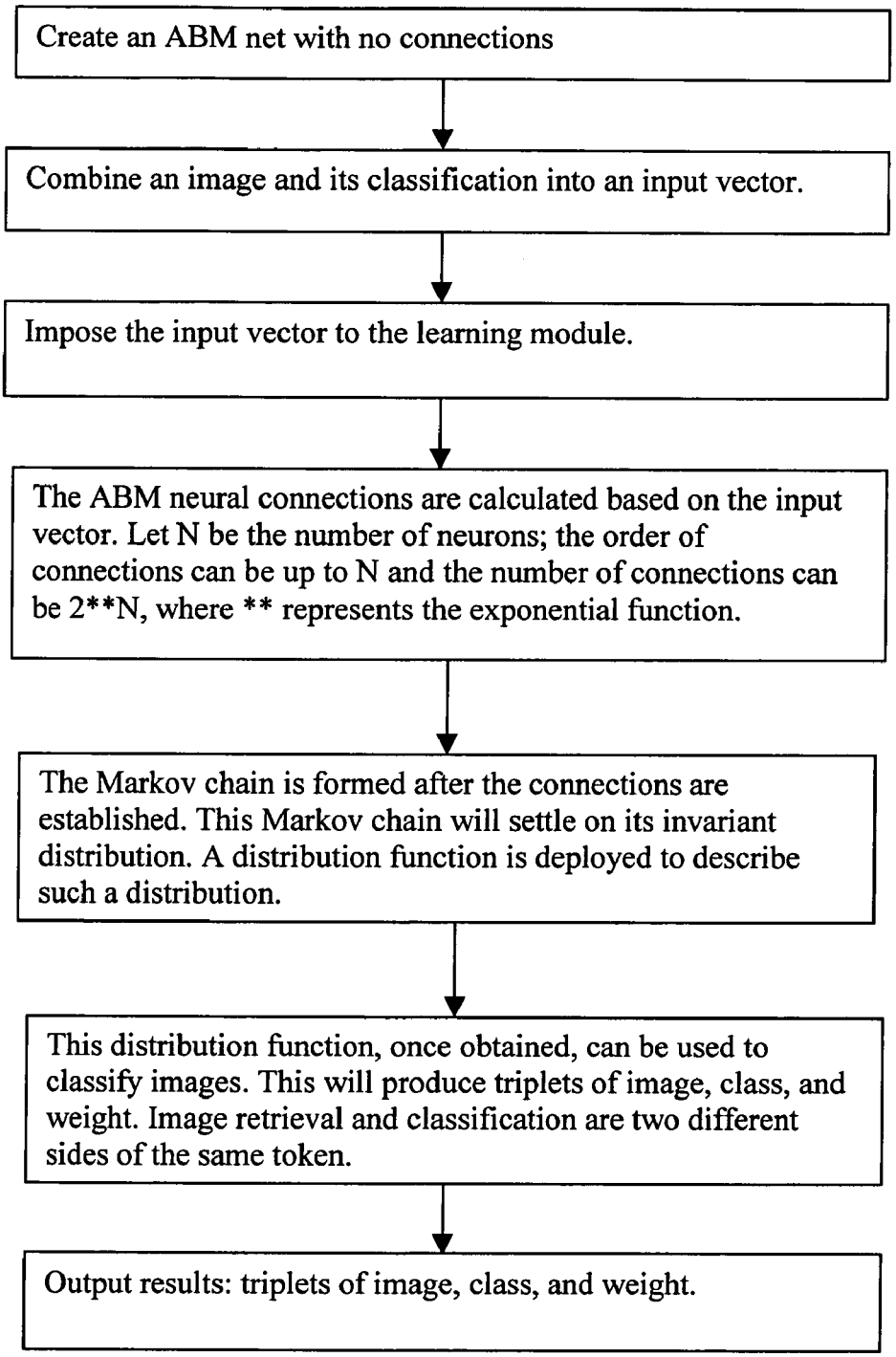
FIG. 12 shows the More Detailed ABM Process Flow Chart.

FIG. 12 shows the ABM Process Flow Chart. ABM is for black-and-white images and APN is for color images. The basic approach, including the base Markov chain, is identical. The only difference is that the APN will construct two extra vectors, one from the training image and one from each search image. These two vectors will be used to modify the scores of the ABM Process, i.e. the invariant distribution of the Markov chain.

Overview of the APN Process

The APN Process is an extension of the ABM Process. The ABM Process is for binary images and the APN Process is for multi-valued images. The APN Process will first use the ABM Process to make an image matching for binary images. If there is no match from the ABM Process, the ABM Recognition algorithm will output a score 0, which will remain to be 0 when the APN Recognition algorithm finishes. If there is a match for the ABM Recognition algorithm, then the APN will further modify the ABM results by comparing two vectors generated by comparing two images. For example, consider two images (3 5 0 0) and (1 2 0 0), their binary versions are 1100 and 1100. The ABM Recognition algorithm will compare the binary image, 1100 and 1100, and return a match. The APN Recognition algorithm will take the ABM results, and modify it by comparing (3 5) and (1 2).

The basic flow chart for the APN Process is:

1. Create an APN neural net with no connections.
2. Combine an image and its classification into an input vector.
3. Impose the input vector to APN Net.
4. The APN neural connections are calculated based on the input vector. Let N be the number of neurons; the order of connections can be up to N and the number of connections can be 2N, where  represents the exponential function.
5. A mapping over each connection is established. Let K be a number of neurons in a K order connection, where K is less than or equal to N, then there will be a K to K mapping, i.e. the domain of the mapping has K integers and the range of the mapping has K integers.
6. The K-element mapping is changed to N-element mapping by adding (N−K) pairs of 0 to 0 relations for each of the neurons not in the set K. By taking the domain of this mapping away, the range of this mapping forms a vector, APN connection vector.
7. The Markov chain is formed after the connections are established. This chain will settle on its invariant distribution. A distribution function is deployed to describe such a distribution.
8. This distribution function, once obtained, can be used to classify images. This will produce triplets of image, class, and weight.
9. Comparing the input-vector and the APN-connection-vector modifies this weight. This will produce a new set of triplets of image, classification, and weight.
10. These triplets of (image, class, weight) can be viewed as the results of the classification process. For the search process, a doublet of image and weight are displayed. The second part of the triple is omitted because the search problem has only one class.

Explanation:

Step 1, see Step 1 of the ABM net above.

Step 2, see Step 2 of the ABM net above.

Step 3, see Step 3 of the ABM net above.

In Step 4, the underlying ABM will be trained. See Step 4 of the ABM net above.

Step 5 represents the extensions from a binary ABM net to a multi-value APN net. In the TECHNICAL BACKGROUND section, we have stated the black-and-white image is a subset and the color image is a subset of particles with mass. The K-to-K mapping in this step represents the mapping from a particle to its mass; therefore, the images used are not black-and-white images, but color images. For a given training image, this mapping is defined by the input image. For example, let N=4 and K=3, and let a training image be (10, 20, 30, 0), then the base black-and-white image is 1110 and the mapping is $\{0 \rightarrow 10, 1 \rightarrow 20, \text{ and } 2 \rightarrow 30\}$. For both the training image and search image, this K-to-K mapping will be computed in a similar way.

In Step 6, the K-to-K mapping will be modified twice. It will first be converted into N-to-N (many to many) mapping first. In the above example, this new mapping is $\{0 \rightarrow 10, 1 \rightarrow 20, 2 \rightarrow 30, 3 \rightarrow 0\}$. Then it will be normalized. For example, the new mapping is the old mapping divided by 2: $\{0 \rightarrow 5, 1 \rightarrow 0, 2 \rightarrow 15, 3 \rightarrow 0\}$. Now the Domain of the mapping, $\{0, 1, 2, 3\}$ is removed and the Range of the mapping converted into a vector $\{5, 10, 15, 0\}$. This APN connection vector is the difference between the ABM net and the APN net.

Step 7, see Step 5 of the ABM net above.

Step 8, see Step 6 of the ABM net above.

Step 9, the results in Step 8 are modified in this step. The distance ($L_p$-distances, where $p=1, 2, \ldots, \infty$) between the new APN connection vector generated by an input search image and the APN connection vector generated by the training vector is computed. This distance modifies the results in Step 8. It could be as simple as dividing the old weights by the distance.

Step 10, see Step 7 of the ABM net above.

Figure 13:
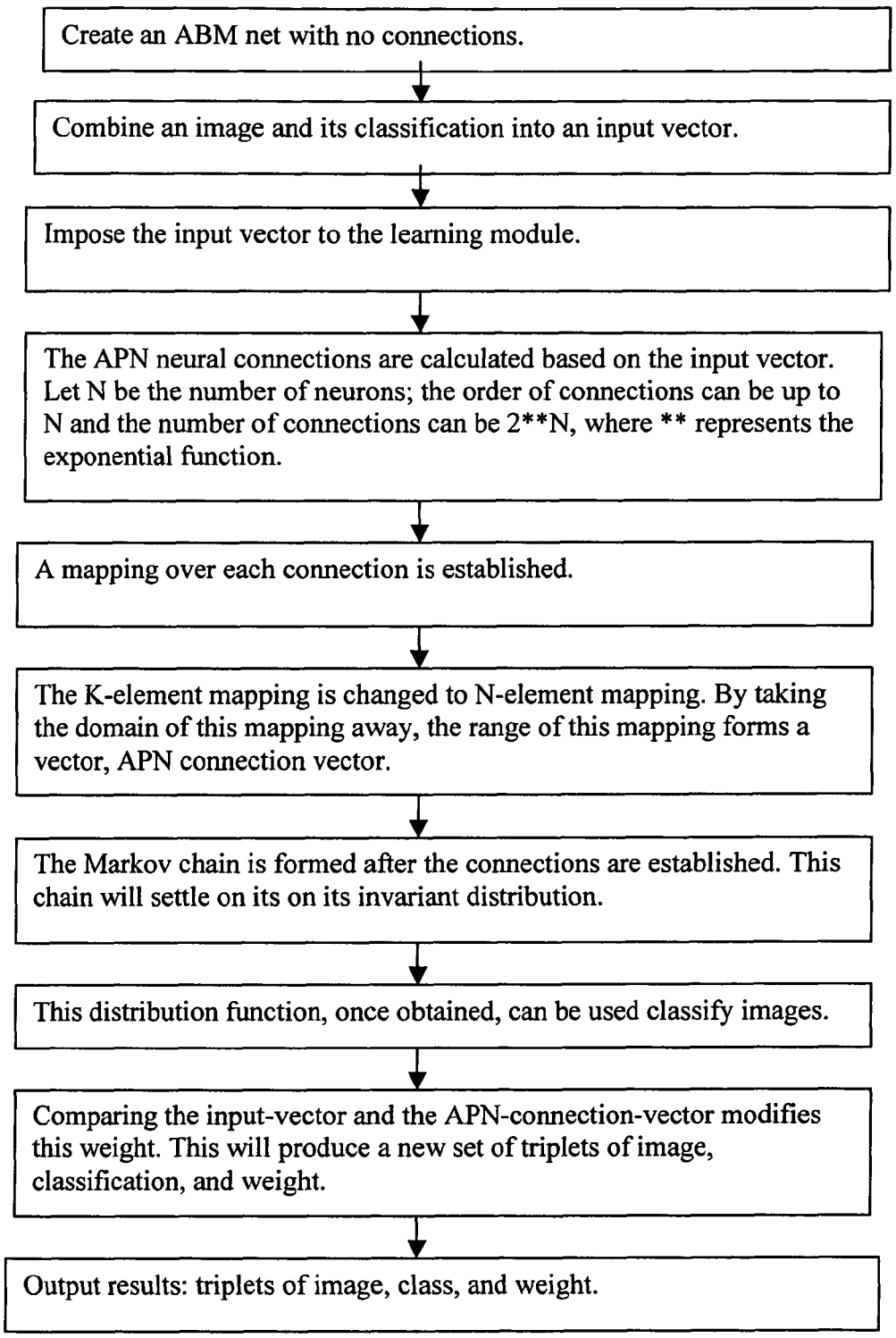
FIG. 13 shows the More Detailed APN Process Flow Chart. The APN algorithm is an extension of the ABM algorithm. The ABM algorithm is for binary images and the APN algorithm is for multi-valued images. The APN algorithm will first use the ABM algorithm to make an image matching for binary images. If there is no match from the ABM algorithm, the ABM algorithm will output a score 0, which will remain to be 0 when the APN algorithm finishes. If there is a match for the ABM algorithm, then the APN will further modify the ABM results by comparing two input vectors generated by the two comparing images. For example, consider two images (3 5 0 0) and (1 2 0 0), their binary versions are 1100 and 1100. The ABM algorithm will compare the binary images, 1100 and 1100, and return a match. The APN algorithm will take the ABM results, and modify it by the distance between (3 5) and (1 2).

FIG. 13 shows the ABM Process Flow Chart.

User Interface Layer of Software for Implementation of ABM and APN Algorithms

There are three major operations:

Search or Retrieval;

Classification; and

Batch.

These are the principle modes of the system that run on the workstation. The software executed in these three modes can have various user interfaces, such as in Windows environment or the web environment, etc. The user interface collects necessary information for the computation.

A Search process has two phases: learning and recognition. In the learning phase, a key image is used to train the proposed system what to look for by using the ABM or the APN learning algorithm. In the recognition phase, the proposed system searches through all images in a search-directory or a search-database for comparisons via the ABM or the APN recognition algorithm. The sample outputs are given in FIG. 5 and FIG. 6. The User Interface Layer is responsible for collecting all parameters, including key images and sources of images. The User Interface Layer will also pass the parameters to the translation layer, which converts an image into an input vector.

The examples of the parameters are various distance used by the algorithms, such as Sensitivity, Blurring, and Shape Cut. These are various distances calculated by the system in the image space and the connection space, which are introduced in the TECHNICAL BACKGROUND section. The users set up the thresholds for these distances and the system computes these distances between two images. If a distance is greater than the user-specified value, the images do not match. Within the user specified range, the smaller these distances are, the higher the matching scores will be.

The "Sensitivity" deals with the sample segment size; high sensitivity is for small segment(s) and low sensitivity is for large segment(s). This is a method to limit the relevant neural connections. The connection space is given in the TECHNICAL BACKGROUND section. When the ABM net, x1, is trained, there will be certain connections. All possible connections together form a space, H1. For the ABM net with N neurons, such a space will have a maximum of 2N connections, where  is the exponential function. Each trained ABM net will have a set h1, representing non-zero connections. When deciding whether an image, I2, in a search directory is a match to the current sample image, I1, this image I2 can be turned around to train the new but similar ABM neural net, x2. This will generate a set of connections, h2. Sensitivity determines a maximum distance in the Connection Space, d, between h1 and h2. Given a search image, which generates h2, if the distance between h1 and h2 is greater than the Sensitivity, then there is no match between the input search image and the key image. Users set Sensitivity as a parameter of the proposed system; see the Sensitivity button in a sample implementation in FIG. 3. For example, assume there are four binary neurons {0, 1, 2, 3} and the set of all possible connections is {nothing; 0, 1, 2, 3; 01, 02, 03, 12, 13, 23; 012, 013, 023, 123; 0123}, where {0, 1, 2, 3} are self connections, {01, 02, 03, 12, 13, 23} are regular connections, and {012, 013, 023, 123; 0123} are the high order connections. These numbers are the subscripts of a synaptic connection matrix element that defines the action of a neuron:

$$X_k' = f(1, a_k, a_{ik}X_i, a_{ijk}X_iX_j, a_{ijlk}X_iX_jX_l, \ldots)$$

Figure 14:
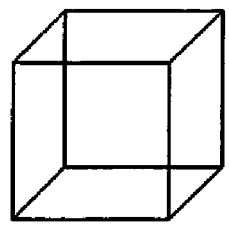
FIG. 14 shows the Connection Space and the Sensitivity distance. (a) Three-dimensional connection space. (b) Four-dimensional connection space. Assume two connections are 1100 and 1111, then the Sensitivity distance between them is 2, if the $L_1$ distance is used, where $L_1=|x_2-x_1|+|y_2-y_1|+\ldots$. Here 1100 means that neuron 0 and neuron 1 have a non-zero connection matrix element; and 1111 means there exists a non-zero matrix element between neuron 0, 1, 2, and 3.
Figure 14:
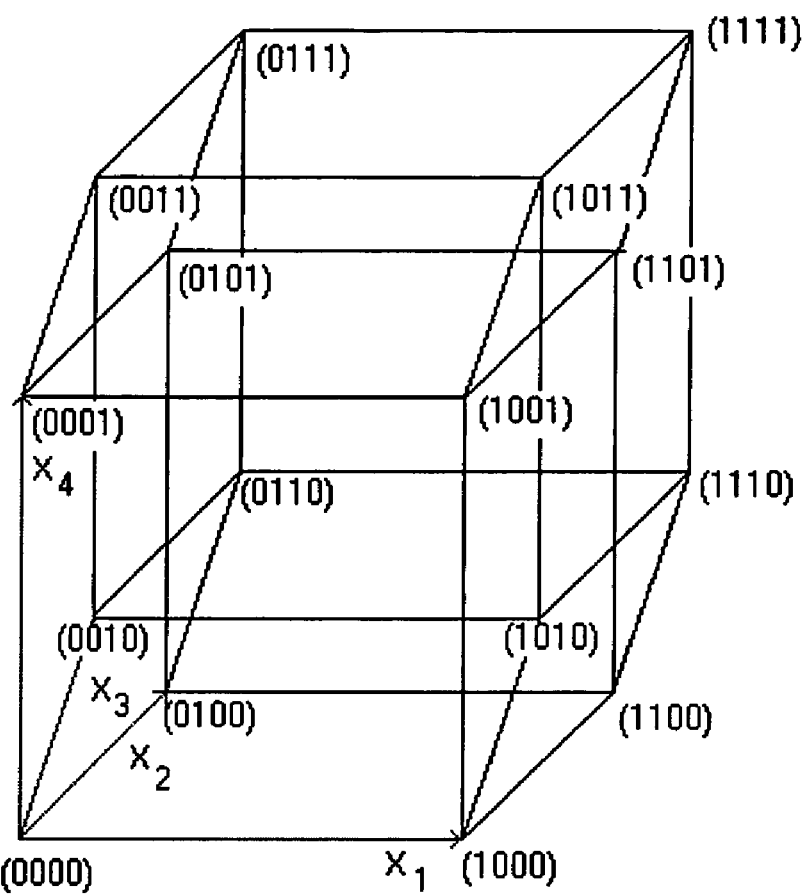

Each connection in this space is considered as a point. Assume one image generates a set, h1={01, 02, 03, 12, 13, 23}, and a second image generates the same set, h2={01, 02, 03, 12, 13, 23}. Assume the $L_1$ distance is used for Sensitivity distance, where $L_1 = |x_2-x_1| + |y_2-y_1| + \ldots$, then the Sensitivity distance between h1 and h2 is 0. Assume one image generates a set, h1={01} and a second image generates a set, h2={0123}, then the Sensitivity distance between h1 and h2 is 2, because the distance between 1100 and 1111 is 2. The best way to compute the Sensitivity distance is to use the connection space in the TECHNICAL BACKGROUND section, which converts the connections into binary strings. For example, 01→1100, 02→1010, 03→1001. FIG. 14 shows the connection space.

Figure 15:
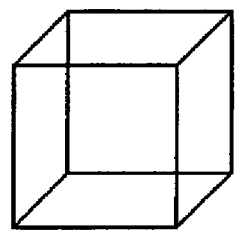
FIG. 15 shows the Image Space and the Blurring distance. (a) Three-dimensional binary image space. (b) Four-dimensional binary image space. Assume a binary image is 1111, we can draw a "sphere" around 1111 with a radius of 1. The following binary images are in this sphere: 1111, 0111, 1011, 1101, 1110. All these images in this "sphere" will be considered the same as the original image, 1111. Blurring is a user-defined parameter that defines this radius. Any image in this sphere is as good as the original image, 1111, for image matching.
Figure 15:
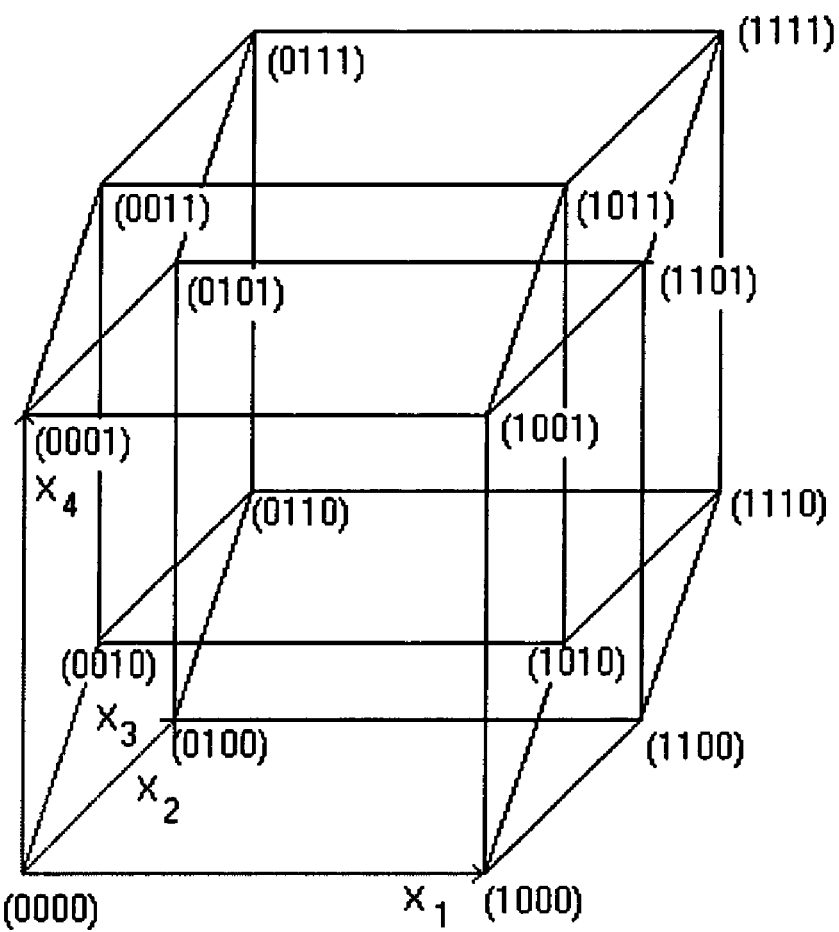

The "Blurring" measures the distortion due to data compression, translation, rotation, scaling, intensity change, or image format conversion. For example, when an image in the bitmap format is saved into the jpeg format, the pixel values change slightly, which are not visible to human eyes. An image is a point in an image space. The image space is given in the TECHNICAL BACKGROUND section. All possible images (points) together form a space, the image space. An image is a point in such a space. When deciding whether an image, I2, in a search directory is a match to the training image, I1, the distance, d (I1, I2) can be calculated. Blurring enlarges this comparison. In the image space, any image in I2's neighborhood is just as good as I2. Blurring determines the radius of this neighborhood. I2's neighborhood consists of all images with a certain distance from I2. The distance can be either the Hausdorff distance, or L1 distance, or L2 distance (See the TECHNICAL BACKGROUND section), or multiple distances. The maximum radius to define the neighborhood is Blurring or Blurring distance, which is specified by the user as a parameter, i.e. users enter a value for this parameter in the user interface; see the Blurring button in a sample implementation in FIG. 3. For example, let x=1111 be a four-pixel binary image, the following images have a distance of 1 from the original image x: 0111, 1011, 1101, 1110. FIG. 15 shows the binary image space. A "sphere" with radius 1 around x will consist of a center x=1111, and 0111, 1011, 1101, 1110.

Figure 3:
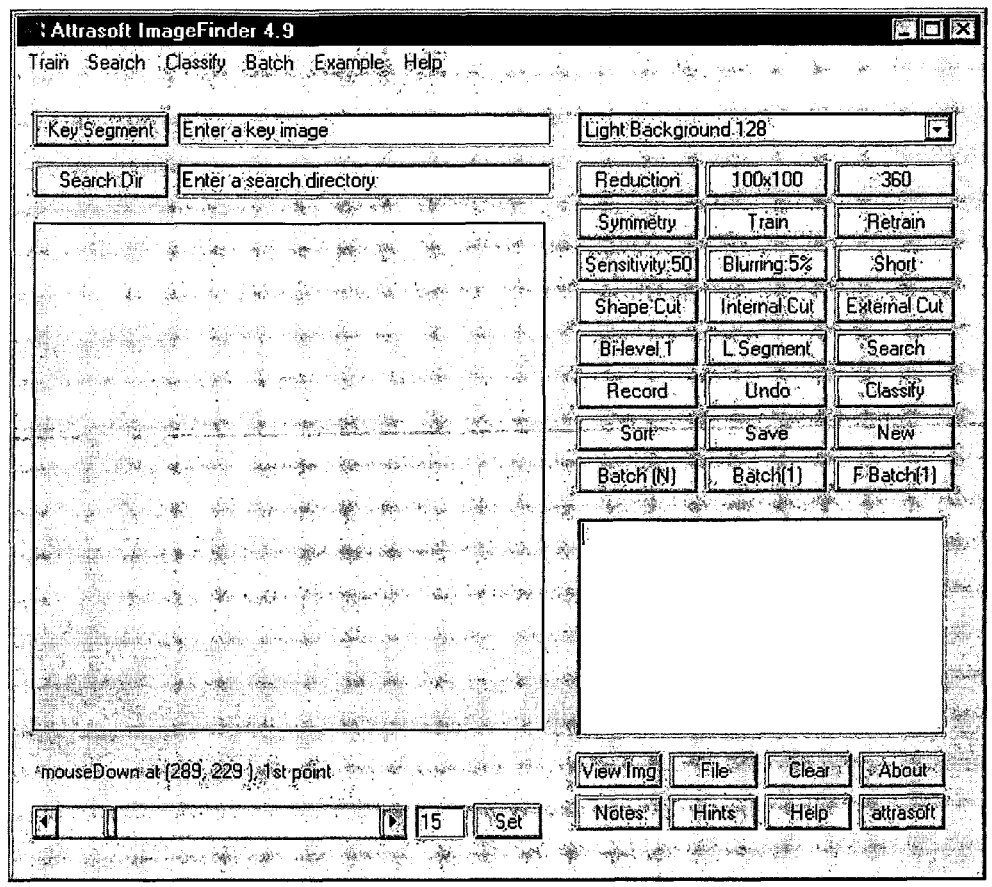
FIG. 3 shows a sample User Interface of the Present Invention.
Figure 4:
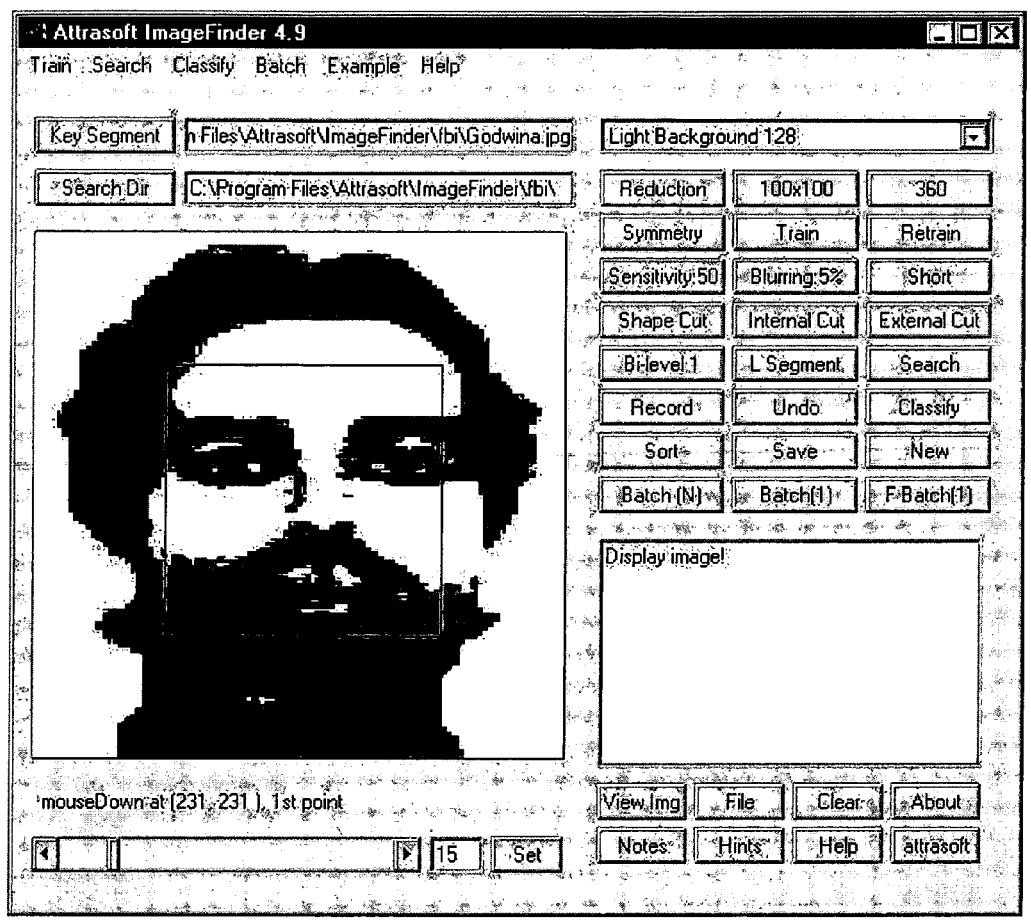
FIG. 4 shows a sample Key Input for the Present Invention.

The "Shape Cut" is to eliminate many images that have different shapes from the sample segment. All possible images together form a space, the image space. The image space is given in the TECHNICAL BACKGROUND section. All possible images together form a space, the image space. An image is a point in such a space. There are several distances defined in this image space, including $L_p$-distances, where p=1, 2, . . . , ∞ and the Hausdorff distance. When deciding whether an image, I2, in a search directory is a match to the current sample image, I1, the distance, d (I1, I2) can be calculated. "Shape Cut" determines a maximum distance, D, either using the Hausdorff distance, L1 distance, L2 distance, or multiple distances. If the distance between I1 and I2 is greater than "Shape Cut", d (I1, I2)>D, then there is no match between the input search image and the key image. A user specifies the Shape Cut as a parameter, i.e. users enter a value for this parameter in the user interface (FIG. 3 and FIG. 4).

Presentation Layer of Software for Implementation of ABM and APN Algorithms

Figure 1:
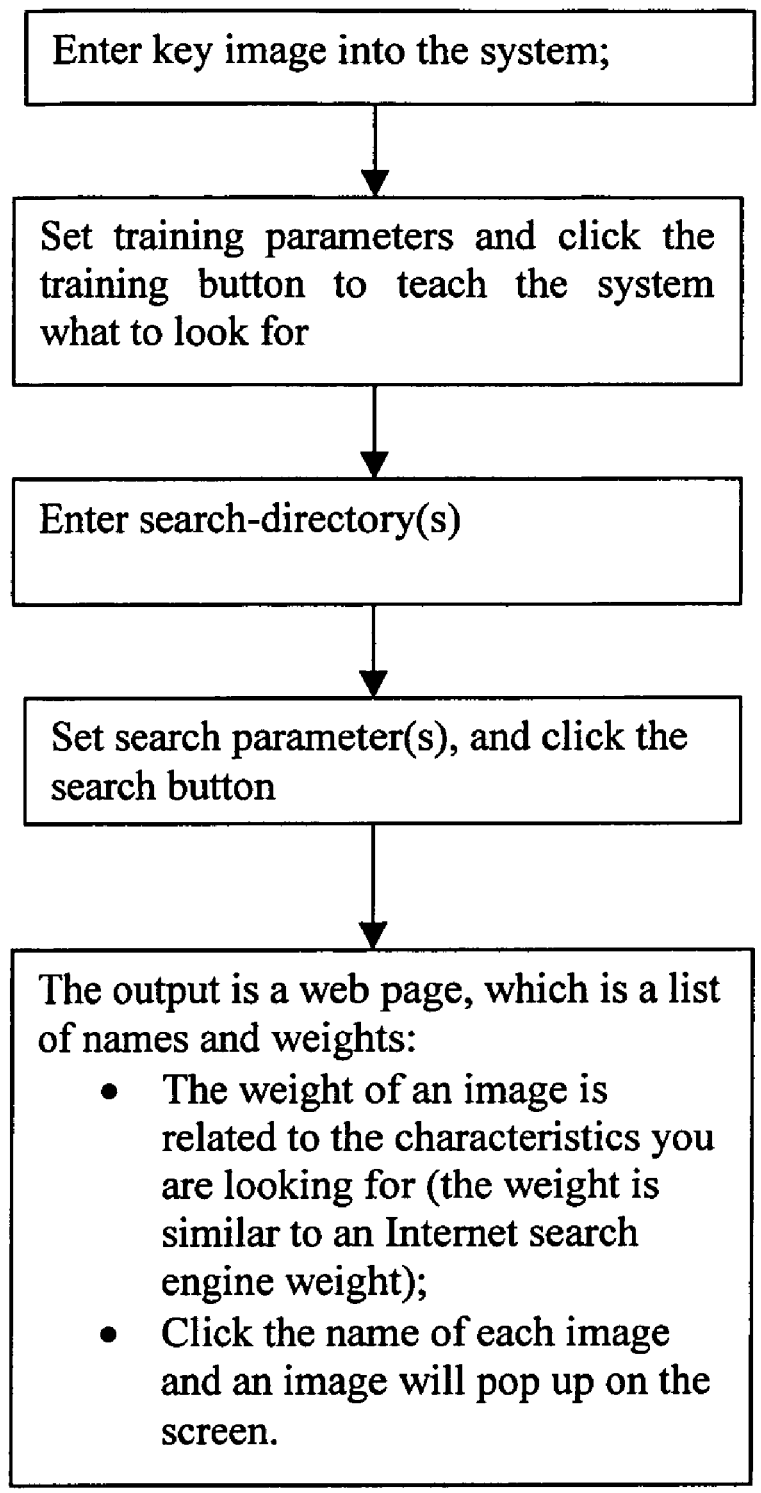
FIG. 1 shows an Image Retrieval Process, which is applicable for image verification, identification, and retrieval.
Figure 2:
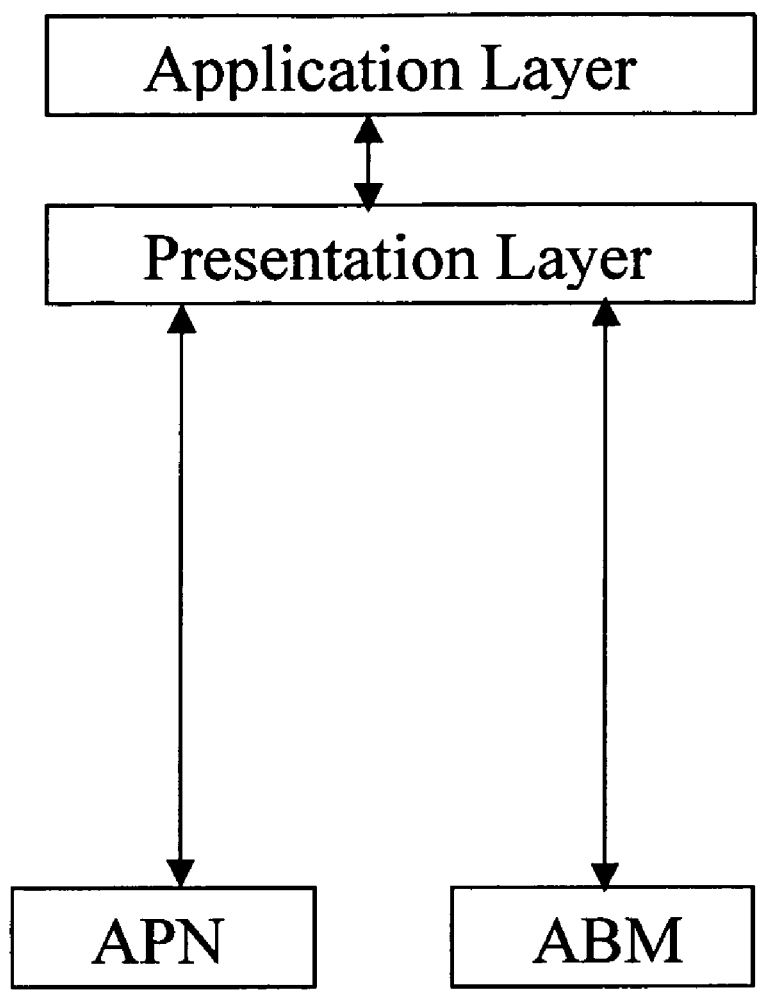
FIG. 2 shows a 3-Layer Attrasoft Internal Architecture.

FIG. 2 shows the position of the presentation layer. The presentation layer transforms the image data to neural data. The procedure includes:
1. Open files from the image source;
2. Decode the image into pixels arrays;
3. Process images with a filter;
4. Reduce the size of images to an internal representation. The users can arbitrarily choose the internal representation of the images. Such reduction can be based on individual images on a case-by-case reduction, or deploy the same reduction factor across to all images.
5. In the case where many pixels in an image have to be combined into a new pixel before leaving this layer, the user can choose a reduction type such as taking average, maximum, minimum, or deploy a threshold. The result is an input-vector.
6. Pass the input-vector to the next layer, the ABM or APN layer (See FIG. 2 for the three layers).

ABM Layer of Software for Implementation of ABM and APN Algorithms

The upper level of this layer has two branches:
Training Objects
 High level training class
 Low level training class, and
 Symmetry class
Recognition Objects
 High level recognition class
 Low level recognition class The lower level of this layer has only one class, the memory management class.

The purpose of the memory management class is to claim memory space from RAM, 64K at a time. This memory space will be used for storing the connections. It also returns the unnecessary space back to the operating system of the computer.

The low level training object is to provide all necessary functions used by the high level training class.

The symmetry object is to implement the symmetry defined earlier.

The high level training class incorporates symmetry and implements the ABM or APN algorithm. The "Image Type" parameter in the user interface will determine which algorithm will be used.

The basic idea for the training algorithms for both the ABM and the APN is as follows: (1) Break a training image into segments; (2) compute the first connection matrix element from a segment; (3) Compute the rest of the matrix elements from the first element; (4) repeat for all segments. Breaking an image into segments can be as simple as dividing an image into 10×10 segments. For example, a binary image 11111111 can be divided into 4 segments: 1100000, 00110000, 00001100, and 00000011.

ABM Training Algorithm is:
1. Delete the existing ABM connections.
2. Combine an image and its classification into an input vector.
3. The ABM neural connections are calculated based on the input vector. Let N be the number of neurons, these connections can be up to the order of N. The image is randomly broken down into a predefined number of pieces, for example, 10×10 pieces or 8×8 pieces.
4. Let an image piece, p1, have K=(k1+k2) pixels, where K is an integer. After imposing the pixel vector to the ABM net, k1 is the number of neurons excited and k2 is the neurons of neurons grounded. A neural state vector can be constructed to represent such a configuration, which k1 components being 1 and k2 components being 0.
5. All neuron configurations together form a space, the configuration space. All neuron connections together form a space, the connection space. Now make the configuration vector=connection vector=p1, which results in the first synaptic connection matrix element.
6. Calculations of the rest of the matrix elements is based on a distance in the configuration space, either the Hausdorff distance or L1 distance or L2 distance, and the first matrix element calculated in the last step. The definition of the connection space in the TECHNICAL BACKGROUND section yields the definition of a distance between connections. Many connection vectors will be in a group with a distance of 1 from p1. Many vectors will be in a group with a distance of 2 from p1. A connection represented by p1 is assigned the largest value. Those connections in the group of distance 1 will have smaller values than the first synaptic connection matrix element; those connections in the group of distance 2 will have even smaller values, . . . . After a certain distance, the connection matrix elements will be 0. There are many ways to generate these matrix elements from the first matrix element. The present invention covers all possible combinations of such a generating method.
7. The Markov chain is formed after the connections are established.

Explanations:
Step 1. A new neural net is initiated.
Step 2. The explanation on how to combine an image and its classification into a vector is given in the TECHNICAL BACKGROUND section.

Step 3. The training image is broken into several pieces. For example, an image {10, 20, 0, 0, 30, 40, 50, 0, 0, 0} can be broken into two pieces, {10, 20, 0, 0, 30} and {40, 50, 0, 0, 0}.

Step 4. For a given image piece, k1 are the excited neurons and k2 are the grounded neurons. Assume an image is {10, 20, 0, 0, 30}, and it is sent to a neural net {0, 1, 2, 3, 4}, then k1=3 and k2=2. The excited neurons are 0, 1, and 4. The grounded neurons are 2 and 3. The neuron configuration vector is 11001. The neural net configuration space is explained in the TECHNICAL BACKGROUND section. 11001 is a point in this configuration space.

Step 5. The neural net connection space is explained in the TECHNICAL BACKGROUND section. This step makes the configuration vector and the connection vector the same, resulting in calculating the first synaptic connection matrix element. In the above example, the configuration vector is 11001. Assign it to the connection vector, i.e. the first non-zero connection is between neurons {0, 1, 4}, $a_{014}$=10+20+30. Again, both the configuration space and the connection space are explained in the TECHNICAL BACKGROUND section.

Step 6. After the first connection matrix element is calculated, others can be calculated. In the above example, the following connection vectors have a distance of 1 from 11001: 01001, 10001, 11101, 11011, and 11000. They are obtained by changing one of the five bits. The following connection vectors have a distance of 2 from 11001: 00001, 01101, 01011, 01000, 10101, 10011, 10000, 11111, 11100, 11010, . . . . The computation of new matrix elements will be determined by a function f(a, d), where a is the first matrix element in Step 5 and d is the distance. For example, f(a, d)=a/(1+d). In the above example, $a_{014}$=60 and 01001 has the distance of 1 from $a_{014}$, therefore, $a_{14}$=$a_{014}$/(1+d)=60/(1+1)=30. Similarly, $a_{04}$=$a_{14}$=30.

Step 7. Once the connection matrix is calculated, the ABM neural net is defined. It behaves like the Boltzmann Machine, i.e. each neuron has a certain probability to be excited, based on the connection matrix. This probabilistic neural net defines a Markov chain.

The following example shows a comparison among an ABM net, an image, the input-vector, the first connection vector, the first connection-matrix element value, the rest of the connection vectors, and the rest of the connection matrix element values:

Let a 5-neuron ABM net be {0, 1, 2, 3, 4};
Let a pixel array of an image segment be: {5, 15, 10, 30, 0, 1, 0, 1, 0 60};
Then an input vector is {10, 20, 0, 0, 30};
The first connection vector is: 11001;
The first connection-matrix element value is: $a_{014}$=10+20+30;
The rest of the connection vectors are: 01001, 10001, 11101, 11011, and 11000;
The rest of the connection values are: $a_{14}$=$a_{014}$/(1+d)=60/(1+1)=30, $a_{04}$=$a_{14}$=30, . . . .

APN Training Algorithm is:
1. Delete the existing ABM connections.
2. Combine an image and its classification into an input vector.
3. The ABM neural connections are calculated based on the input vector. Let N be the number of neurons, these connections can be up to the order of N. The image is randomly broken down into a predefined number of pieces.

4. Let an image piece, p1, have K=(k1+k2) pixels, where K is an integer. After imposing the pixel vector to the ABM net, k1 is the number of neurons excited and k2 is the number of neurons grounded. A neural state vector can be constructed to represent such a configuration, which k1 components being 1 and k2 components being 0.
5. All neuron configurations together form a space, the configuration space. All neuron connections together form a space, the connection space. Now make the configuration vector=connection vector=p1, which results in the first synaptic connection matrix element.
6. Calculations of the rest of the matrix elements are based on a distance in the configuration space, either the Hausdorff distance or L1 distance or L2 distance, and the first matrix element calculated in the last step. The definition of the connection space in the TECHNICAL BACKGROUND section yields the definition of a distance between connections. Many connection vectors will be in a group with a distance of 1 from p1. Many vectors will be in a group with a distance of 2 from p1. A connection represented by p1 is assigned the largest value. Those connections in the group of distance 1 will have small values; those connections in the group of distance 2 will have even smaller values, . . . . After a certain distance, the connection matrix elements will be 0. There are many ways to generate these matrix elements from the first matrix element. The present invention covers all possible combinations of such a generating method.
7. The Markov chain is formed after the connections are established.
8. For each connection, in addition to the synaptic connection weight, a mapping over each connection is established. Let k1 be a number of neurons in the original k1 order connection generated by p1, then this mapping maps from the k1 neuron to the k1 pixel value which excited these neurons. This completes the connection for the original segment p1.
9. The segment, p1, also generates many other connections. If a neuron in this connection is one of the original k1 neurons in p1, then this neuron is mapped into the corresponding pixel value, which causes this neuron to be excited; otherwise, this neuron is mapped into 0. This completes the mappings of all connections generated by this segment, p1.

Figure 16:
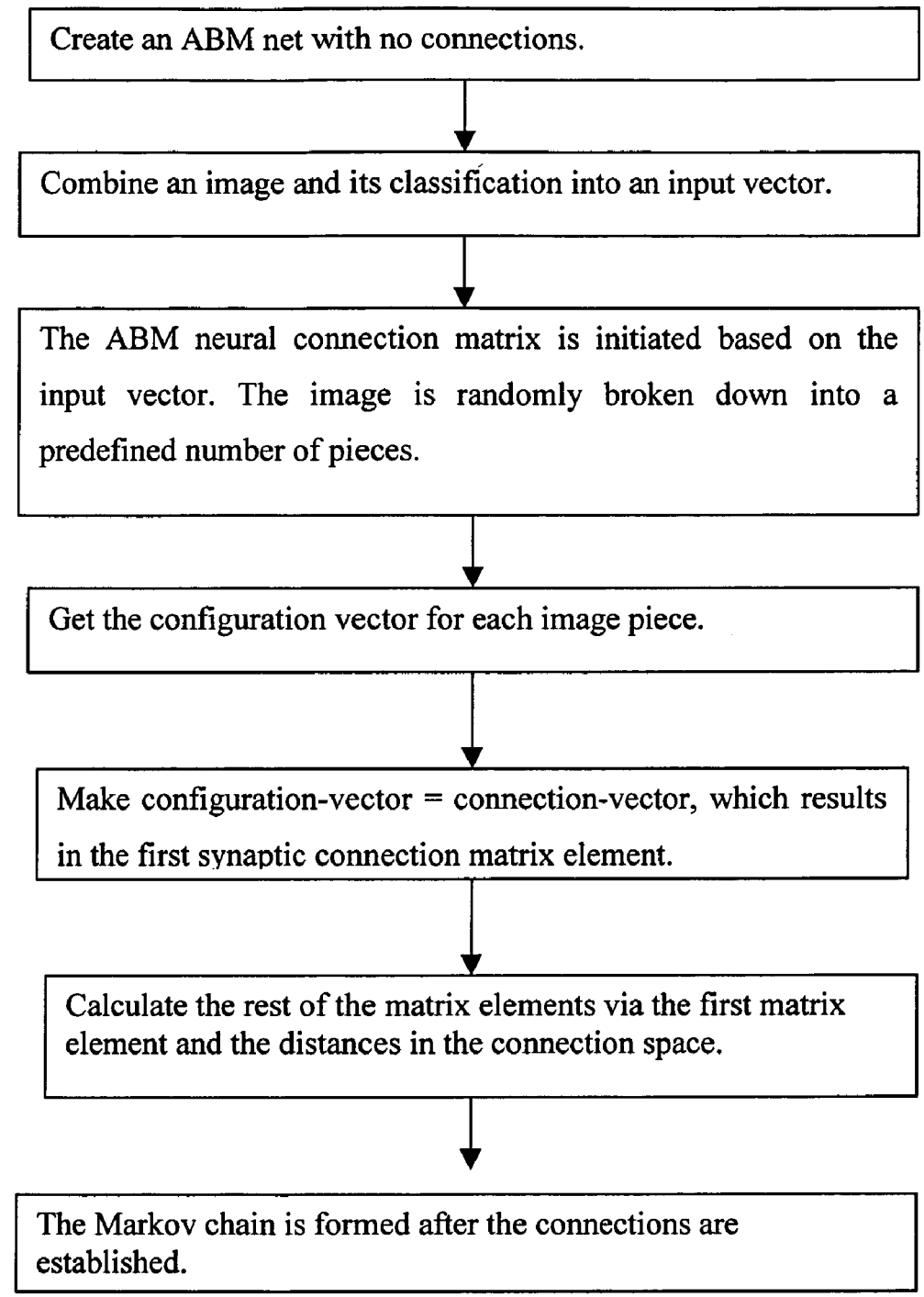
FIG. 16 shows the ABM Learning Algorithm Flow Chart.
Figure 17:
FIG. 17 shows APN Learning algorithm, which is an extension of the ABM algorithm for non-binary values. For example, consider two images (3 5 0 0) and (1 2 0 0), their binary versions are 1100 and 1100. The ABM algorithm will compare the binary images, 1100 and 1100, and return a match. The APN training algorithm will first train the binary ABM net, and then store an additional mapping (0→3, 1→5) for each connection.
Figure 18:
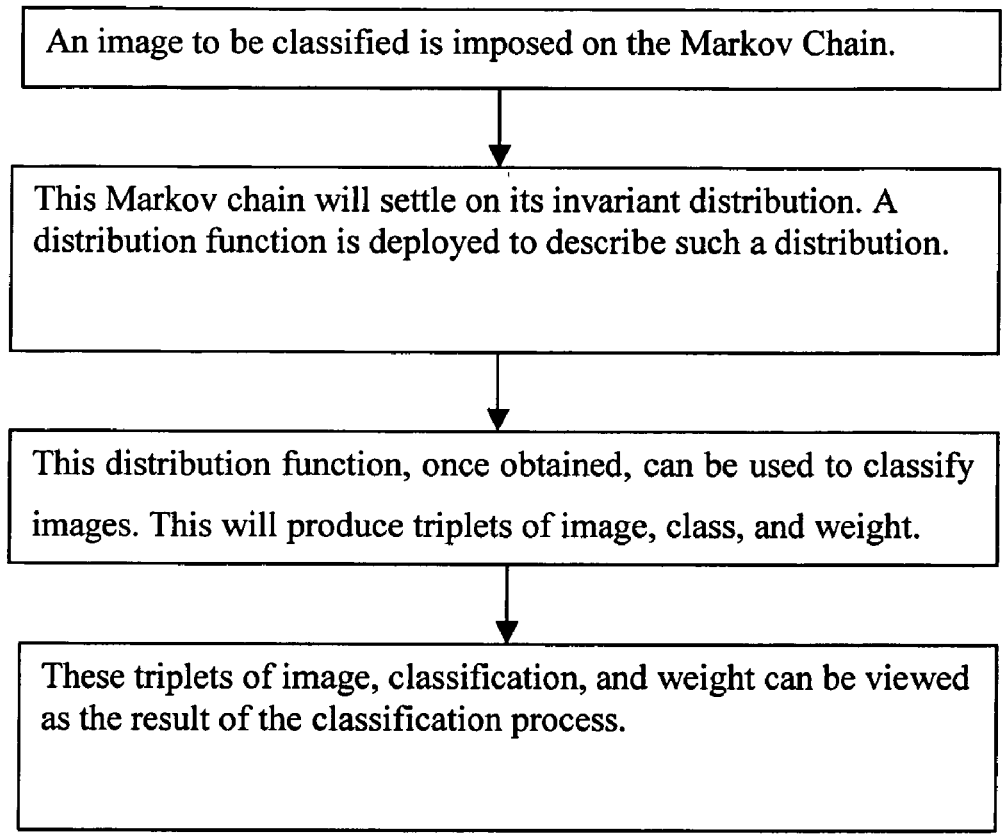
FIG. 18 shows the ABM Recognition Algorithm Flow Chart.
Figure 19:
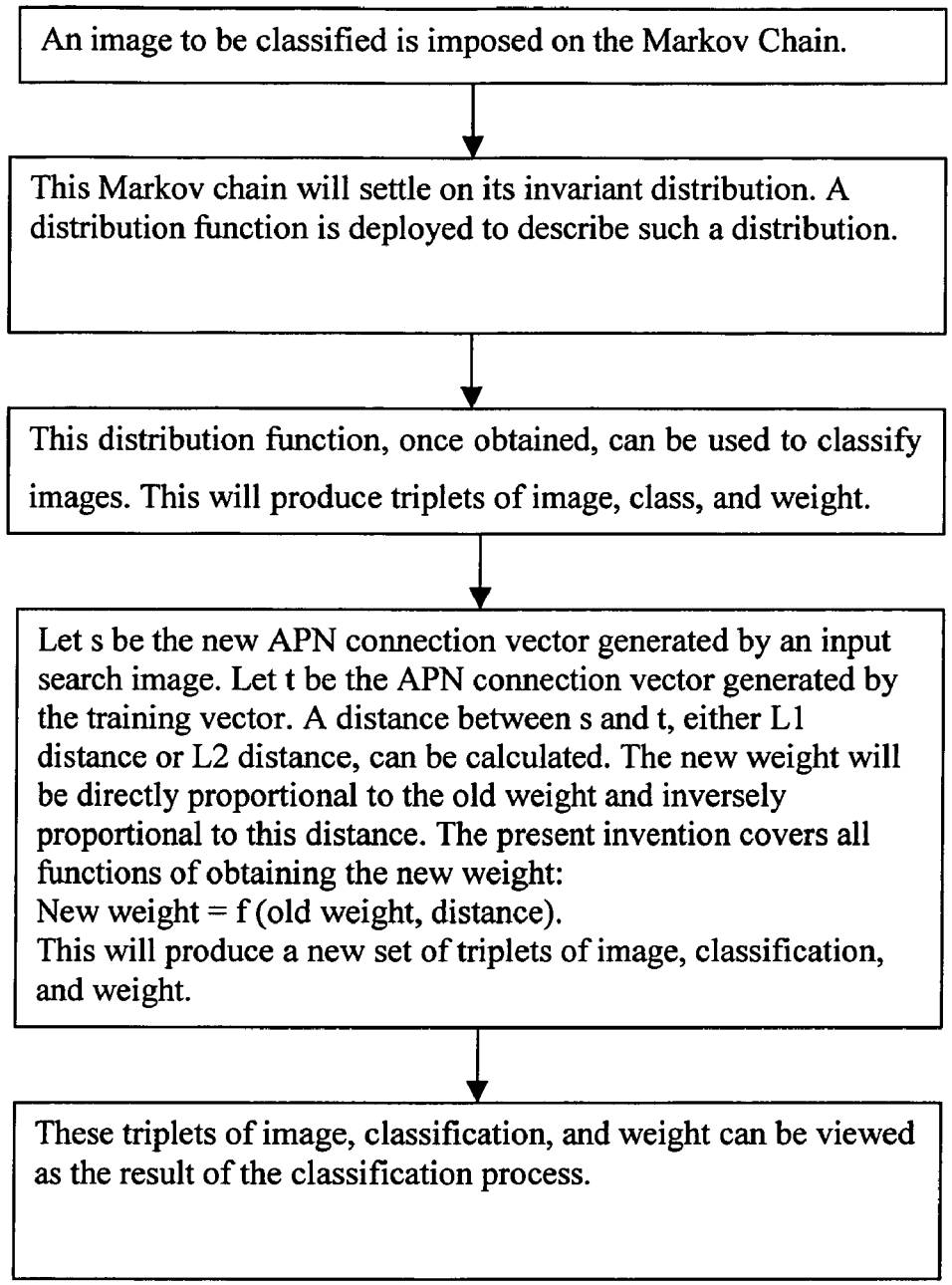
FIG. 19 shows the APN Recognition Algorithm Flow Chart.

The APN Training Algorithm is exactly the same as the ABM Training Algorithm, with the one exception of storing a mapping associated with each connection. FIG. 16 shows the ABM and APN Training Algorithm.

EXAMPLE

Let a 5-neuron ABM net be {0, 1, 2, 3, 4};
Let a pixel array of an image segment be: {5, 15, 10, 30, 0, 1, 0, 1, 0 60};
Then an input vector is {10, 20, 0, 0, 30};
The first ABM connection vector is: 11001;
The first ABM connection-matrix element value is: $a_{014}$=10+20+30;
The rest of the ABM connection vectors are: 01001, 10001, 11101, 11011, and 11000;
The rest of the ABM connection values are: $a_{14}=a_{014}/(1+d)=60/(1+1)=30$, $a_{04}=a_{14}=30$, . . . ;
The first APN connection is {$a_{014}$=10+20+30=60, (0→10, 1→20, 4→30)}, where (0→10, 1→20, 4→30) is the mapping for $a_{014}$;
The rest of the APN connections are: {$a_{14}$=30, (1→20, 4→30)}, where (1→20, 4→30) is the mapping associated with $a_{14}$; {$a_{04}$=30, (0→10, 4→30)}, where (0→10, 4→30) is the mapping associated with $a_{04}$; . . . .

The low-level recognition object is to provide all necessary functions used by the high-level recognition class. The high-level recognition class implements the ABM or APN algorithm.

The basic idea for the recognition algorithms for both the ABM and the APN is as follows:
A trained ABM or APN net forms a Markov chain, which will settle on an invariant distribution;
The distribution function will classify the images.
ABM Recognition Algorithm is:
1. An image to be classified is imposed on the Markov chain.
2. This Markov chain will settle on its invariant distribution. A distribution function is deployed to describe such a distribution.
3. This distribution function, once obtained, can be used to classify images. This will produce triplets of image, class, and weight. Image retrieval and classification are two different sides of the same token.
4. These triplets of image, classification, and weight can be viewed as the results of the classification process. For the search process, a doublet of image and weight are displayed. The second part of the triple is omitted because the search problem has only one class.

Explanation
Step 1. An ABM net is already trained with a training image, I1, at this point. The ABM net also behaves like a Markov chain. A new image is entered to the ABM net, which has an input vector, x.
Step 2. This Markov chain has an invariant distribution, described by a function z=f(y), where y looks like this (x, 0) or (x, 1). Here x is an input vector. The distribution function will produce triplets (x, 0, z0) and (x, 1, z1), where z0 and z1 may or may not be 0.
Step 3. The invariant distribution function actually classifies the image as follows: the probability of x in class 1, meaning x matches the training image I1, is z1; and the probability of x in class 0, meaning x does not match the training image I1, is z0. The ABM recognition algorithm only deals with z1. If z1 is greater than a certain threshold, I1 and x will be a match; otherwise, I1 and x will not match.
Step 4. The triplet (x, 1, z1) is converted into a doublet (x, z1). A sample output is in FIG. 5.

APN Recognition Algorithm is:
1. An image to be classified is imposed on the Markov chain.
2. This chain will settle on its on its invariant distribution. A distribution function is deployed to describe such a distribution.
3. This distribution function, once obtained, can be used to classify images. This will produce triplets of image, class, and weight.
4. Comparing the input-vector and the APN-connection-vector modifies this weight. All connection vectors together form a vector space. A distance, either L1 distance or L2 distance, can be defined in this space. The basic idea is the new weight will be directly proportional to the old weight and inversely proportional to this distance. The present invention covers all functions of obtaining the new weight:

New weight=f(old weight,distance).

This will produce a new set of triplets of image, classification, and weight.

5. These triplets of image, classification, and weight can be viewed as the results of the classification process. For the search process, a doublet of image and weight are displayed. The second part of the triple is omitted because the search problem has only one class.

Explanation

Step 1. See Step 1 of the ABM Recognition algorithm above.

Step 2. See Step 2 of the ABM Recognition algorithm above.

Step 3. See Step 3 of the ABM Recognition algorithm above.

Step 4. The ABM weight is modified by a formula,

New weight=$f$(old weight,distance).

For example, $z1'=z1/(1+distance)$. The old triplet (x, 1, z1) will become a new triplet (x, 1, z1').

Step 5. The triplet (x, 1, z1') is converted into a doublet (x, z1'). A sample output is in FIG. 5.

Sample Implementation

We will present three sample implementations based on FIG. 2 (3-Layer Architecture). The first example has all 3 layers; the second example has only 1 layer; and the third example has 2 layers.

There are two CD's labeled "Document, Sample Implementation". The disks contain only three ASCII files. Each disk in the duplicate set is identical. The contents of the CD are:

| File Name | Type | Size | Date | Description |
|---|---|---|---|---|
| ABM4_9 | TXT | 156,256 | May 16, 2002 | Detailed description of ImageFinder 4.9 |
| ABM5_0 | TXT | 96,515 | May 16, 2002 | Detailed description of PolyApplet 5.0 |
| ABM5_1 | TXT | 43,019 | May 16, 2002 | Detailed description of TransApplet 5.1 |

These three files will give detailed descriptions of the three sample implementations below.

Attrasoft ImageFinder 4.9

Figure 5:
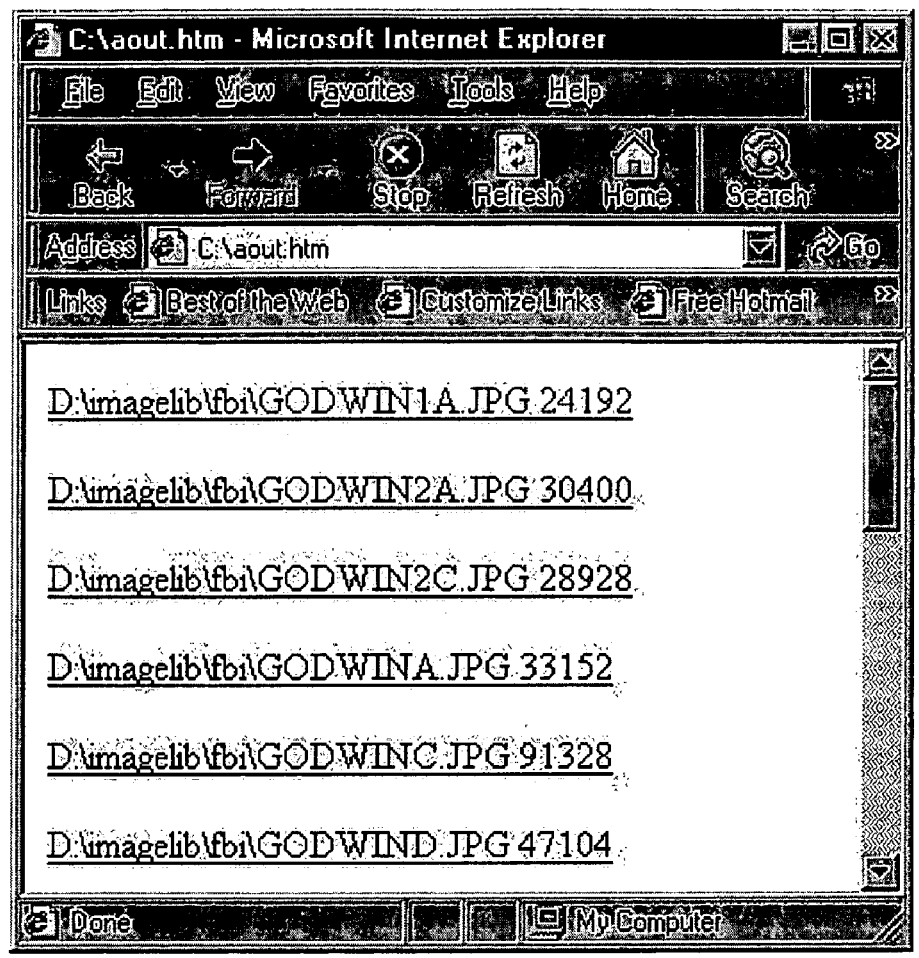
FIG. 5 shows a sample Retrieval Output of the Present Invention. The search output is a list of pairs. For example, line one of the FIG. 5 shows a double (image, score), where the image is "D:\GODWIN1A.JPG", and the score is 24192.
Figure 5:
Figure 5:
Figure 6:
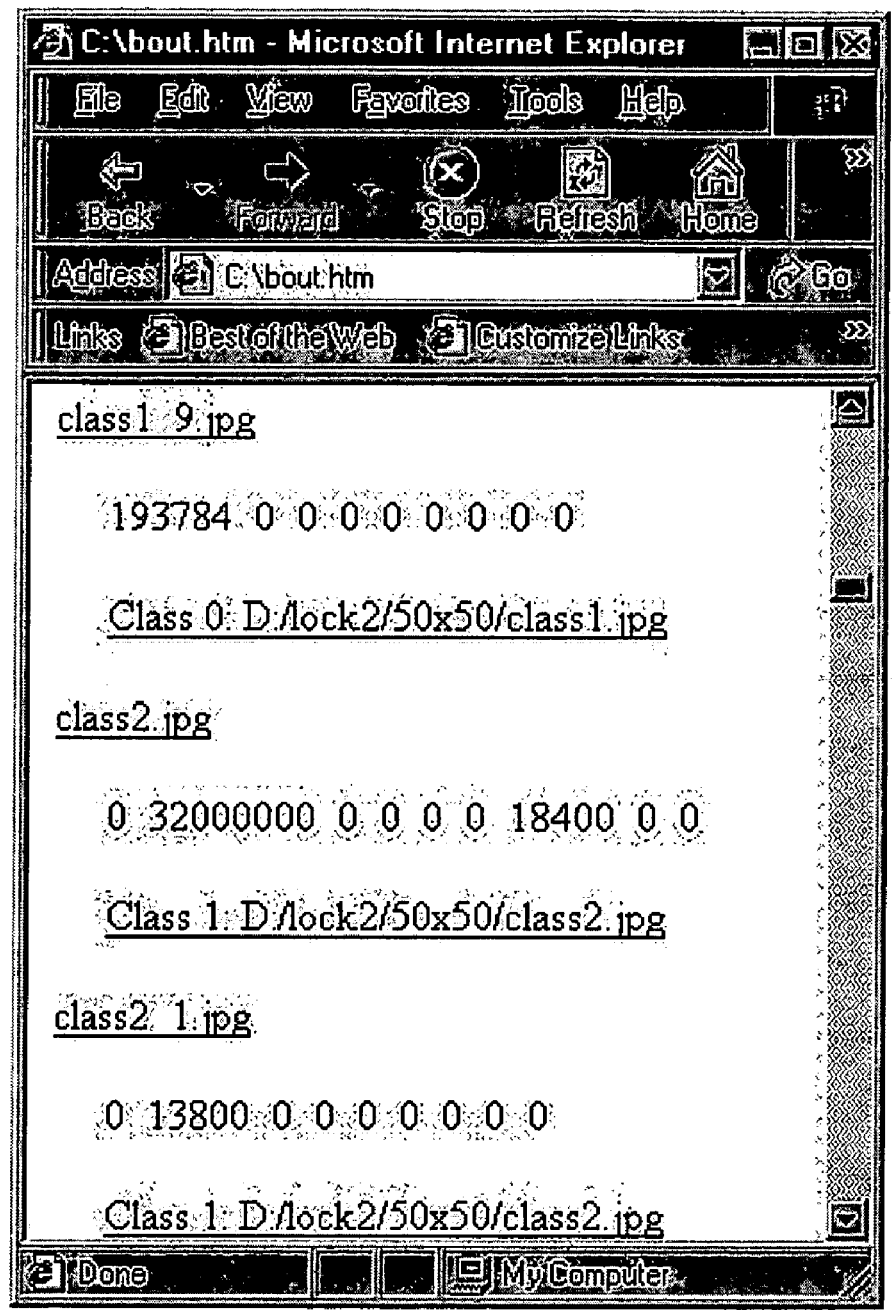
FIG. 6 shows a sample Classification output of the Present Invention. The classification output is a list of triplets. The N:N (many to many) classification is implemented by a set of 1:N (one to many) searches. Let a and b be two different classes. Given an image, x, we can perform a 1:N (one to many) search for class a, with a triplet (x, a, score-x-a); and a 1:N (one to many) search for class b, with a triplet (x, b, score-x-b). The final answer is (x, score-x-a, score-x-b; max{score-x-a, score-x-b}). In the above figure, the first line, "class1__9.jpg" is an image, x. The second line has 9 scores, indicating how likely the image x belongs to any of the 9 classes. Finally, Class 0 is the best match because it has the maximum score, 193784. The training image for class 0 is "D:/ . . . /class1.jpg". The third line in the above figure shows the classification result of the image, "class1__9.jpg", which is also a link to the training image, "D:/ . . . /class1.jpg".
Figure 7:
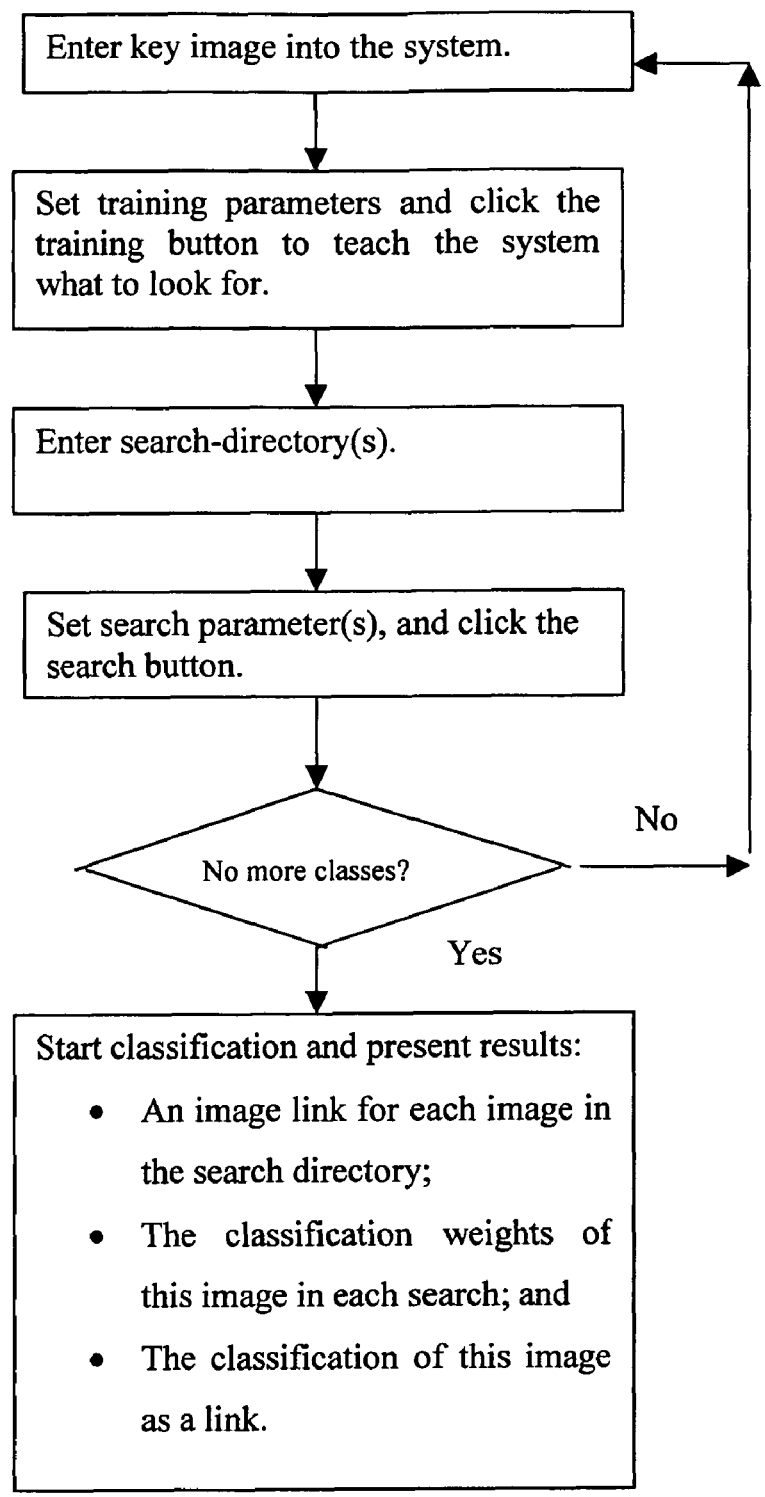
FIG. 7 shows the Classification Process, which consists of a multiple-search process in FIG. 1.
Figure 8:
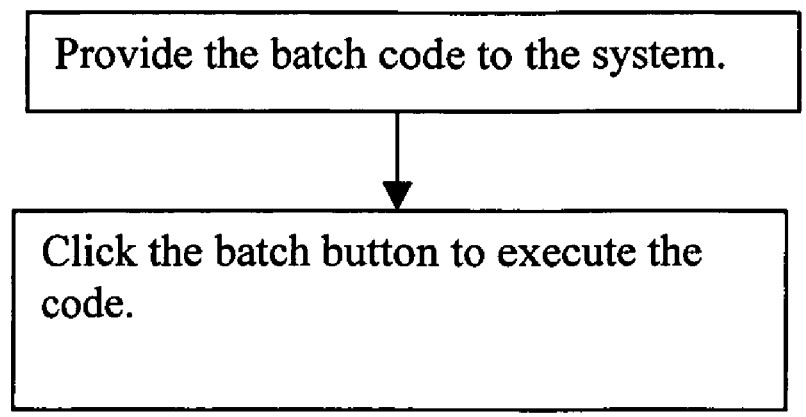
FIG. 8 shows the Batch Process, which allows users to duplicate a Search or Classification in two clicks.
Figure 9:
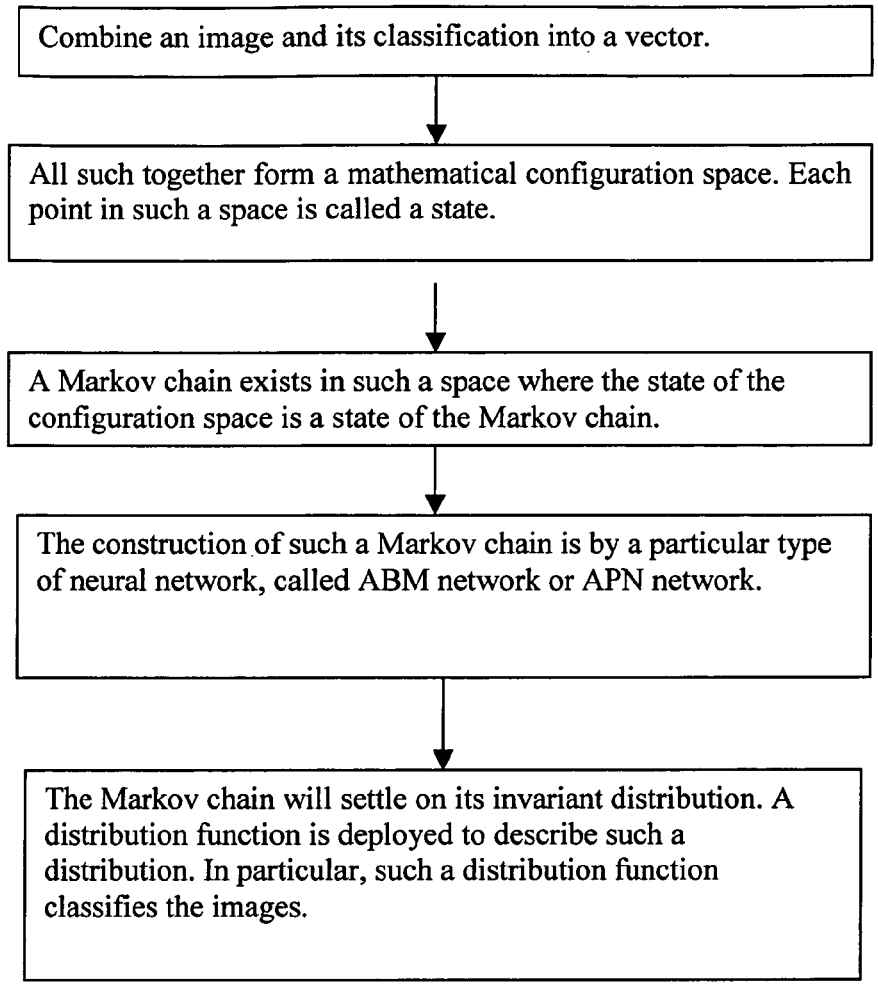
FIG. 9 shows the ABM and APN Process Flow Chart.

A sample Invention Application Software is the Attrasoft ImageFinder 4.9, which has all three layers in FIG. 2. FIG. 3 shows the ImageFinder User Interface using the Present Invention. FIG. 4 shows a sample Key Input in the ImageFinder software using the Present Invention. FIG. 5 shows a sample Search Output of the Present Invention. The search output is a list of pairs. FIG. 6 shows a sample Classification output of the Present Invention. The classification output is a list of triplets.

The ASCII file, ABM4_9.TXT, in the CD's labeled "Document, Sample Implementation" will give a detailed description.

In addition, two CD's, labeled "Attrasoft ImageFinder 4.9", contain sample implementation software. The software can be installed and run to test the proposed algorithm. Note:

A. The CD's contain non-ASCII files, such as the installation file and execution files. The installation files will install the following executable files to a computer with Microsoft Windows as the operating system:

Attrasoft ImageFinder 4.9 for Windows 95/98/ME, execution files;

Attrasoft ImageFinder 4.9 for Windows 2000/XP, execution files;

Data File for running the software;

User's Guide in Microsoft Word, and

User's Guide in html format.

These five files can also be run from the CD.

B. The Operating System is Windows 95, 98, ME, 2000, and XP.

C. Each disk in the duplicate set is identical.

D. CONTENTS OF THE CD.

Root Directory Contents:

| File Name | Type | Size | Date | Description |
|---|---|---|---|---|
| DISK1 | ID | 5 | Jan. 05, 1990 9:31p | Installation File |
| DISK10 | ID | 5 | Jan. 05, 1990 9:31p | Installation File |
| DISK11 | ID | 5 | Jan. 05, 1990 9:31p | Installation Fite |
| DISK12 | ID | 5 | Jan. 05, 1990 9:31p | Installation File |
| DISK13 | ID | 5 | Jan. 05, 1990 9:32p | Installation File |
| DISK14 | ID | 5 | Jan. 05, 1990 9:32p | Installation File |
| DISK2 | ID | 5 | Jan. 05, 1990 9:32p | Installation File |
| DISK3 | ID | 5 | Jan. 05, 1990 9:32p | Installation File |
| DISK4 | ID | 5 | Jan. 05, 1990 9:33p | Installation File |
| DISK5 | ID | 5 | Jan. 05, 1990 9:33p | Installation File |
| DISK6 | ID | 5 | Jan. 05, 1990 9:33p | Installation File |
| DISK7 | ID | 5 | Jan. 05, 1990 9:33p | Installation File |
| DISK8 | ID | 5 | Jan. 05, 1990 9:34p | Installation File |
| DISK9 | ID | 5 | Jan. 05, 1990 9:34p | Installation File |
| SETUP | EXE | 47,616 | Jan. 05, 1990 9:31p | Installation File |
| SETUP | INI | 32 | Jan. 05, 1990 9:31p | Installation File |
| SETUP | INS | 147,449 | Jan. 05, 1990 9:31p | Installation File |
| SETUP | ISS | 510 | Jan. 05, 1990 9:31p | Installation File |
| SETUP | PKG | 15,061 | Jan. 05, 1990 9:31p | Installation File |
| _INST32I | EX_ | 306,666 | Jan. 05, 1990 9:31p | Installation File |
| _ISDEL | EXE | 8,192 | Jan. 05, 1990 9:31p | Installation File |
| _SETUP | 1 | 721,623 | Jan. 05, 1990 9:31p | Installation File |
| _SETUP | 10 | 1,454,681 | Jan. 05, 1990 9:31p | Installation File |
| _SETUP | 11 | 1,455,574 | Jan. 05, 1990 9:31p | Installation File |
| _SETUP | 12 | 1,455,468 | Jan. 05, 1990 9:31p | Installation File |
| _SETUP | 13 | 1,454,113 | Jan. 05, 1990 9:32p | Installation File |
| _SETUP | 14 | 1,074,165 | Jan. 05, 1990 9:32p | Installation File |
| _SETUP | 2 | 1,454,796 | Jan. 05, 1990 9:32p | Installation File |
| _SETUP | 3 | 1,456,887 | Jan. 05, 1990 9:32p | Installation File |
| _SETUP | 4 | 1,455,245 | Jan. 05, 1990 9:33p | Installation File |
| _SETUP | 5 | 1,455,918 | Jan. 05, 1990 9:33p | Installation File |
| _SETUP | 6 | 1,455,206 | Jan. 05, 1990 9:33p | Installation File |
| _SETUP | 7 | 1,453,720 | Jan. 05, 1990 9:33p | Installation File |
| _SETUP | 8 | 1,455,603 | Jan. 05, 1990 9:34p | Installation File |
| _SETUP | 9 | 1,456,571 | Jan. 05, 1990 9:34p | Installation File |
| _SETUP | DLL | 10,752 | Jan. 05, 1990 9:31p | Installation File |
| _SETUP | LIB | 196,219 | Jan. 05, 1990 9:31p | Installation File |
| ABM49 | <DIR> | | Jun. 08, 2001 1:04p | Executable File |
| USPTO72 | <DIR> | | Feb. 28, 2001 7:15p | Data File |
| USPTO74 | <DIR> | | May 21, 2001 4:33p | Data File |

E. Interpretation of the files

Please see Appendix A for the detailed interpretation of the roles of these files. To install the software to a Personal Computer using Windows, double click the setup.exe file.

Attrasoft PolyApplet 5.0

A sample Invention Application Software is the PolyApplet 5.0, which only has the Neural Layer of this invention.

The ASCII file, ABM5_0.TXT, in the CD's labeled "Document, Sample Implementation" will give a detailed description.

Attrasoft TransApplet 5.1

A sample Invention Application Software is the TransApplet 5.1, which has both Neural Layer and the Presentation Layer of this invention.

The ASCII file, ABM5_1.TXT, in the CD's labeled "Document, Sample Implementation" will give a detailed description.

In addition, two CD's labeled "Attrasoft TransApplet 5.1" contain sample implementation of the software library. Note:
A. The disks contain only Non-ASCII files. The CD contains the following files:
   Attrasoft TransApplet 5.1 software library for Windows 95/98/ME/2000/XP, COM/DLL file format;
   Sample Implementation Code;
   User's Guide in Microsoft Word, and
   User's Guide in html format.
B. The Operating System is Windows 95, 98, ME, 2000, and XP.
C. Each disk in the duplicate set is identical.
D. CONTENTS OF THE CD:
   Root Directory Contents:

| File Name | Type | Size | Date | Description |
|---|---|---|---|---|
| | | Root Directory Contents: | | |
| ABM5_1 | DOC | 616,448 | Oct. 21, 2001 11:28a | User's Guide, Word |
| CHAP3 | <DIR> | | Oct. 19, 2001 4:31p | Examples |
| CHAP4 | <DIR> | | Oct. 19, 2001 4:31p | Examples |
| CHAP5 | <DIR> | | Oct. 19, 2001 4:31p | Examples |
| CHAP6 | <DIR> | | Oct. 19, 2001 4:31p | Examples |
| CHAP7 | <DIR> | | Oct. 19, 2001 4:32p | Examples |
| FBI | <DIR> | | Jun. 08, 2001 1:04p | Examples |
| HELP | <DIR> | | Oct. 19, 2001 4:40p | User's Guide, Word |
| OBLIQUE | <DIR> | | Jun. 08. 2001 1:04p | Examples |
| README | TXT | 567 | Oct. 20, 2001 10:51a | readme.txt |
| TRANS~26 | DLL | 282,112 | Oct. 21, 2001 11:00a | COM DLL |

E. Interpretation of the files
(E1) The file labeled "COM DLL" is the COM DLL software library file to be used by users.
(E2) The directories, labeled "Examples", contain the examples of how to use the COM DLL.
(E3) The files, labeled "User's Guide, Word" and the directory, "User's Guide, html", contain the User's Guide.

What is claimed is:

1. A process for recognizing a digital image using a computer and an ABM algorithm, where ABM is the "Attrasoft Boltzmann Machine", which further consists of the ABM training algorithm and the ABM recognition algorithm, said ABM training algorithm comprises:
   Imposing an image to an ABM so the ABM will be trained, whereas the ABM is a specific combination of (a) a fully connected neural network and (b) a Markov chain;
   Classifying at least one target image based on the invariant distribution function of the trained ABM wherein the step of Imposing an image to an ABM further comprises:
   a) deleting existing ABM connections;
   b) creating an input vector, p, based on an input image, x, and its classification, y;
   c) breaking the input vector, p, into a number of pieces, p1, p2, p3 . . . , where such breaking could either be logically based on objects/segments or geometrically;
   d) constructing a set of neural state vectors, s1, s2, s3 . . . according to p1, p2, p3 . . . , whereas a state vector, s1, has a number of 0's (grounded state) and a number of 1's (excited state); all such vectors together form a configuration space, H(P);
   e) computing an initial neural connection from each of p1, p2, p3 . . . , said computation comprising:
      e1) constructing a connection space, H(C), where each neural connection is a point inside this space;
      e2) making the connection space, H(C), from a configuration space, H(C)=(H(P), R), where R is a space of real numbers;
      e3) making an initial connection c1 to be c1=(p1, 1), or f(p1)=1, where f(p1) is a connection matrix element;
   f) computing the rest of the neural connections from each of the initial connections, c1, c2, c3 . . . , said computation comprising:
      f1) constructing a distance or distances, d(p1, p1'), between an initial neural state, p1, and an arbitrary state, p1'; said distances can be Hausdorff distance, or L1 distance, or L2 distance, or any other distances;
      f2) constructing a function, g(d), which maps a distance between two neural vectors, d, to a number, g(d); said function comprising of any functions as long as it decreases in value when the distance increases;
      f3) constructing an arbitrary connection element (p1', g(d(p1, p1'))) from the initial connection element;
      f4) applying (p1', g(d(p1, p1'))) for all points in the connection space since the ABM is a fully connected network with all possible ranks; and
   g) constructing an ABM Markov chain after all of the connections are established.

2. The process of claim 1, wherein the step of Classifying at least one target image based on the invariant distribution function of the trained ABM comprises:
   a) imposing an image to be classified on an ABM Markov chain;
   b) allowing the ABM Markov chain to settle on its invariant distribution, described by a distribution function;
   c) classifying the target image based on this invariant distribution function, said distribution comprising of information of classes and weight given by the invariant distribution function directly; and
   d) presenting the results as a triplet (image, classification, weight), which can be used both in image search and image classification.

3. A process for recognizing a digital image using a computer and an APN algorithm, where APN is "Attrasoft PolyNet", an extension of the ABM, which further consists of the APN training algorithm and the APN recognition algorithm, said APN training algorithm comprises:
   Imposing an image to an APN so the APN will be trained, whereas the APN is a specific combination of (a) a fully connected neural network, (b) a Markov chain, and (c) a mapping function (called the APN function);
   Classifying at least one target image based on the invariant distribution function of the trained APN wherein the step of Imposing an image to an APN further comprises:
   a) deleting existing APN connections;
   b) creating an input vector, p, based on an input image, x, and its classification, y;
   c) breaking the input vector, p, into a number of pieces, p1, p2, p3 . . . , where such breaking could either be logically based on objects/segments or geometrically;
   d) constructing a set of neural state vectors, s1, s2, s3 . . . according to p1, p2, p3 . . . , whereas a state vector, s1, has a number of 0's (grounded state) and a number of 1's (excited state); all such vectors together form a configuration space, H(P);
   e) computing an initial neural connection from each of p1, p2, p3 . . . , said computation comprising:

e1) constructing a connection space, H(C), where each neural connection is a point inside this space;
e2) making the connection space, H(C), from a configuration space, H(C)=(H(P), R), where R is a space of real numbers;
e3) making an initial connection c1 to be c1=(p1, 1), or f(p1)=1, where f(p1) is a connection matrix element;

f) computing the rest of the neural connections from each of the initial connections, c1, c2, c3 . . . , said computation comprising:
  f1) constructing a distance or distances, d(p1, p1'), between an initial neural state, p1, and an arbitrary state, p1'; said distances can be Hausdorff distance, or L1 distance, or L2 distance, or any other distances;
  f2) constructing a function, g(d), which maps a distance between two neural vectors, d, to a number, g(d); said function comprising of any functions as long as it decreases in value when the distance increases;
  f3) constructing an arbitrary connection element (p1', g(d(p1, p1'))) from the initial connection element;
  f4) applying (p1', g(d(p1, p1'))) for all points in the connection space since the APN is a fully connected network with all possible ranks;

g) constructing an APN Markov chain after all of the connections are established;

h) constructing an initial mapping to reflect the contribution of the multi-valued neurons; said mapping comprising of pairs: (neuron position, input vector value); and i) constructing the rest of the mappings based on the initial mapping; said mapping comprising of pairs: (neuron position, input vector value in the initial mapping).

4. The process of claim 3, wherein the step of Classifying at least one target image based on the invariant distribution function of the trained APN comprises:
  a) imposing an image to be classified on an APN Markov chain;
  b) allowing the APN Markov chain to settle on its invariant distribution, described by a distribution function;
  c) classifying the target image based on this invariant distribution function; said distribution comprising of information of classes and weight given by the invariant distribution function directly;
  d) constructing intermediate results as a triplet (image, classification, weight);
  e) computing a new weight, said computation comprising:
    e1) constructing a distance between two mappings, the mapping associated with the image to be classified and the mapping associated with a connection;
    e2) constructing a function (called the APN function): weight'=h (weight, d); said function, h, comprising of any functions as long as it decreases in value when the distance, d, increases;
    e3) modifying the old weight by this function; and
  f) constructing results as a triplet (image, classification, weight'), which can be used both in image search and image classification.

* * * * *